US012207248B2

(12) United States Patent
Shen et al.

(10) Patent No.: US 12,207,248 B2
(45) Date of Patent: Jan. 21, 2025

(54) TERMINAL SCHEDULING METHOD, DEVICE, AND STORAGE MEDIUM

(71) Applicant: GUANGDONG OPPO MOBILE TELECOMMUNICATIONS CORP., LTD., Guangdong (CN)

(72) Inventors: Jia Shen, Guangdong (CN); Weijie Xu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 396 days.

(21) Appl. No.: 17/563,932

(22) Filed: Dec. 28, 2021

(65) Prior Publication Data

US 2022/0124753 A1    Apr. 21, 2022

Related U.S. Application Data

(63) Continuation of application No. PCT/CN2019/096902, filed on Jul. 19, 2019.

(51) Int. Cl.
*H04W 72/12*    (2023.01)
*H04W 72/0446*    (2023.01)
(Continued)

(52) U.S. Cl.
CPC ... *H04W 72/1263* (2013.01); *H04W 72/0446* (2013.01); *H04W 72/0453* (2013.01); *H04W 72/20* (2023.01)

(58) Field of Classification Search
CPC ......... H04W 72/0446; H04W 72/0453; H04W 72/1263; H04W 72/20; H04W 72/23
(Continued)

(56) References Cited

U.S. PATENT DOCUMENTS

2007/0211620 A1    9/2007    McBeath et al.
2011/0110339 A1    5/2011    Jeong et al.
(Continued)

FOREIGN PATENT DOCUMENTS

CN    101909300 A    12/2010
CN    101919194 A    12/2010
(Continued)

OTHER PUBLICATIONS

The EESR of corresponding European application No. 19938513.9, dated May 24, 2022.
(Continued)

*Primary Examiner* — Robert J Lopata
(74) *Attorney, Agent, or Firm* — Ladas & Parry LLP

(57) ABSTRACT

Embodiments of the present application provide a terminal scheduling method, a device, and a storage medium, including: a terminal receives control information sent by a scheduling device, the control information including multiple pieces of time-frequency resource information; the terminal determines a time-frequency resource from multiple time-frequency resources indicated by the multiple pieces of time-frequency resource information as a transmission resource of the terminal, and sends or receives data according to the transmission resource. Where multiple time-frequency resources indicated by the control information can be used by multiple terminals, so that the scheduling device is able to schedule multiple terminals through a piece of control information, thus saving the overheads of sending control signaling and enabling different transmission resources to be scheduled for different terminals through a piece of control information.

17 Claims, 16 Drawing Sheets

(51) Int. Cl.
*H04W 72/0453* (2023.01)
*H04W 72/1263* (2023.01)
*H04W 72/20* (2023.01)

(58) Field of Classification Search
USPC .......................................................... 370/329
See application file for complete search history.

(56) References Cited

U.S. PATENT DOCUMENTS

| | | |
|---|---|---|
| 2015/0016361 A1 | 1/2015 | Kim et al. |
| 2018/0167959 A1 | 6/2018 | Liao et al. |
| 2020/0267755 A1* | 8/2020 | Ugurlu .............. H04W 72/0453 |
| 2021/0007081 A1* | 1/2021 | Shin ...................... H04L 1/1896 |
| 2021/0022180 A1* | 1/2021 | Lei ............................ H04L 5/10 |
| 2021/0266133 A1* | 8/2021 | Zhang .................. H04L 1/1861 |
| 2021/0377982 A1* | 12/2021 | Yang .................. H04W 74/0808 |
| 2022/0141070 A1* | 5/2022 | Shen .................. H04W 72/044 370/329 |
| 2022/0201732 A1* | 6/2022 | Takeda .................. H04W 72/23 |

FOREIGN PATENT DOCUMENTS

| | | |
|---|---|---|
| CN | 102316070 A | 1/2012 |
| CN | 102595385 A | 7/2012 |
| CN | 107371244 A | 11/2017 |
| CN | 108964852 A | 12/2018 |

OTHER PUBLICATIONS

International Search Report (ISR) dated Apr. 22, 2020 for Application No. PCT/CN2019/096902.

* cited by examiner

TERMINAL SCHEDULING METHOD, DEVICE, AND STORAGE MEDIUM

CROSS-REFERENCE TO RELATED APPLICATIONS

This application is a continuation of International Application No. PCT/CN2019/096902, filed on Jul. 19, 2019, the content of which is incorporated herein by reference in its entirety.

TECHNICAL FIELD

Embodiments of the present application relate to communication technologies, in particular, to a terminal scheduling method, a device, and a storage medium.

RELATED ARTS

A base station realizes data transmission for a terminal device by performing uplink and downlink scheduling on the terminal device. An existing communication system supports two scheduling modes: unicast scheduling and multicast scheduling.

In unicast scheduling, the base station separately schedules a resource for each terminal device, and each terminal device can transmit different data on the scheduled resource. The multicast scheduling can only be used for downlink transmission, and the base station uses a broadcast control channel to schedule a unified downlink resource for multiple terminal devices.

Since unicast scheduling must send scheduling control signaling for each user separately, resulting in high downlink control signaling overhead. Although broadcast scheduling can enable multiple terminal devices to share one control signaling, all users can only transmit the same data, which cannot meet user needs.

SUMMARY

The embodiments of the present application provide a terminal scheduling method, a device, and a storage medium.

In a first aspect, an embodiment of the present application may provide a terminal scheduling, method, and the method includes:
  receiving, by a terminal, a piece of control information, the control information including multiple pieces of time-frequency resource information;
  determining, by the terminal, a time-frequency resource from multiple time-frequency resources indicated by the multiple pieces of time-frequency resource information as a transmission resource of the terminal; and
  sending or receiving, by the terminal, data according to the transmission resource.

In a second aspect, an embodiment of the present application may provide a terminal scheduling method, and the method includes:
  receiving, a terminal, a piece of control information, the control information including a piece of frequency-domain resource allocation information and a piece of time-domain resource allocation information; and
  acquiring, by the terminal, third indication information and/or fourth indication information to the terminal, the third indication information being used to indicate a position of a frequency-domain transmission resource used by the terminal in a frequency-domain resource indicated by the frequency-domain resource allocation information, the fourth indication information being used to indicate a position of a time-domain transmission resource used by the terminal in a time-domain resource indicated by the time-domain resource allocation information;
  determining, by the terminal, a part of frequency-domain resource from the frequency-domain resource indicated by the frequency-domain resource allocation information as a frequency-domain transmission resource of the terminal, and/or, determining a part of time-domain resource from the time-domain resource indicated by the time-domain resource allocation information as a time-domain transmission resource of the terminal, according to the third indication information and/or the fourth indication information; and
  sending or receiving, by the terminal, data according to the frequency-domain transmission resource and the time-domain transmission resource.

In a third aspect, an embodiment of the present application may provide a terminal scheduling method, and the method includes:
  sending, by a scheduling device, a piece of control information to a terminal, the control information including multiple pieces of time-frequency resource information; and
  sending, by the scheduling device, indication information to the terminal, the indication information being used to indicate the terminal to determine a time-frequency resource from multiple time-frequency resources indicated by the multiple pieces of time-frequency resource information.

In a fourth aspect, an embodiment of the present application may provide a terminal scheduling method, and the method includes:
  sending, by a scheduling device, a piece of control information to a terminal, the control information including a piece of frequency-domain resource allocation information and a piece of time-domain resource allocation information; and
  sending, by the scheduling device, third indication information and/or fourth indication information to the terminal, the third indication information being used to indicate a position of a frequency-domain transmission resource used by the terminal in a frequency-domain resource indicated by the frequency-domain resource allocation information, the fourth indication information being used to indicate a position of a time-domain transmission resource used by the terminal in a time-domain resource indicated by the time-domain resource allocation information.

In a fifth aspect, an embodiment of the present application may provide a terminal, including:
  a receiving module, configured to receive a piece of control information, the control information including multiple pieces of time-frequency resource information;
  a determining module, configured to determine a time-frequency resource from multiple time-frequency resources indicated by the multiple pieces of time-frequency resource information as a transmission resource of the terminal; and
  a transceiving module, configured to send or receive data according to the transmission resource.

In a sixth aspect, an embodiment of the present application may provide a terminal, including:

a receiving module, configured to receive a piece of control information, the control information including a piece of frequency-domain resource allocation information and a piece of time-domain resource allocation information;

an acquiring module, configured to acquire third indication information and/or fourth indication information, the third indication information being used to indicate a position of a frequency-domain transmission resource used by the terminal in a frequency-domain resource indicated by the frequency-domain resource allocation information, the fourth indication information being used to indicate a position of a time-domain transmission resource used by the terminal in a time-domain resource indicated by the time-domain resource allocation information;

a determining, module, configured to determine a part of frequency-domain resource from the frequency-domain resource indicated by the frequency-domain resource allocation information as a frequency-domain transmission resource of the terminal, and/or, determine a part of time-domain resource from the time-domain resource indicated by the time-domain resource allocation information as a time-domain transmission resource of the terminal, according to the third indication information and/or the fourth indication information; and a transceiving module, configured to send or receive data according to the frequency-domain transmission resource and the time-domain transmission resource.

In a seventh aspect, an embodiment of the present application may provide a scheduling device, including:

a sending module, configured to send a piece of control information to a terminal, the control in information including multiple pieces of time-frequency resource information; and the sending module is further configured to send indication information to the terminal, the indication information being used to indicate the terminal to determine a time-frequency resource from multiple time-frequency resources indicated by the multiple pieces of time-frequency resource information.

In an eighth aspect, an embodiment of the present application may provide a scheduling device, including:

a sending module, configured to send a piece of control, information to a terminal, the control information including a piece of frequency-domain resource allocation information and a piece of time-domain resource allocation information; and the sending module is further configured to send third indication information and/or fourth indication information to the terminal, the third indication information being used to indicate a position of a frequency-domain transmission resource used by the terminal in a frequency-domain resource indicated by the frequency-domain resource allocation information, the fourth indication information being used to indicate a position of a time-domain transmission resource used by the terminal in a time-domain resource indicated by the time-domain resource allocation information.

In a ninth aspect, an embodiment of the present application may provide a terminal, including:

a processor, a memory, and an interface for communication with other devices;

the memory stores a computer-executable instruction; and the processor executes the computer-executable instruction stored in the memory, to enable the processor to execute the terminal scheduling method according to the first aspect or the second aspect.

In a tenth aspect, an embodiment of the present application may provide a scheduling device, including:

a processor, a memory, and an interface for communication with other devices;

the memory stores a computer-executable instruction; and the processor executes the computer-executable instruction stored in the memory, to enable the processor to execute the terminal scheduling method according to the third aspect or the fourth aspect.

In an eleventh aspect, an embodiment of the present application may provide a computer-readable storage medium, the computer-readable storage medium stores a computer-executable instruction, and when the computer-executable instruction is executed by a processor, the terminal scheduling method according to the first aspect or the second aspect is implemented.

In a twelfth aspect, an embodiment of the present application may provide a computer-readable storage medium, the computer-readable storage medium stores a computer-executable instruction, and when the computer-executable instruction is executed by a processor, the terminal scheduling method according to the third aspect or the fourth aspect is implemented.

In a thirteenth aspect, an embodiment of the present application provides a program, when the program is executed by a processor, the terminal scheduling method according to the first aspect or the second aspect is executed.

In a fourteenth aspect, an embodiment of the present application provides a program, when the program is executed by a processor, the terminal scheduling method according to the third aspect or the fourth aspect is executed.

In a fifteenth aspect, an embodiment of the present application provides a computer program product, including a program instruction, and the program instruction is used to implement the terminal scheduling method according to the first aspect or the second aspect.

In a sixteenth aspect, an embodiment of the present application provides a computer program product, including a program instruction, and the program instruction is used to implement the terminal scheduling method according to the third aspect or the fourth aspect.

In a seventeenth aspect, an embodiment of the present application provides a chip, which includes a processing module and a communication interface, and the processing module can execute the terminal scheduling method according to the first or the second aspect.

In an eighteenth aspect, an embodiment of the present application provides a chip, which includes a processing module and a communication interface, and the processing module can execute the terminal scheduling method according to the third or the fourth aspect.

BRIEF DESCRIPTION OF DRAWINGS

The accompanying drawings here are incorporated into the specification and form a part of the specification, showing embodiments conforming to the present application, and are used together with the specification to explain the principle of the present application.

Through the above-mentioned accompanying drawings, the specific embodiments of the present application have been shown, and will be described in more detail below. These drawings and text descriptions are not intended to limit the scope of the concept of the present application in any way, but to explain the concept of the present application to those skilled in the art by referring to specific embodiments.

BRIEF DESCRIPTION OF DRAWINGS

To make the purpose, technical solutions and advantages of the embodiments of the present application clearer, the technical solutions in the embodiments of the present application will be described clearly and completely in combination with the accompanying drawings in the embodiments of the present application. Obviously, the described embodiments are a part of the embodiments of the present application, but not all of the embodiments. Based on the embodiments in the present application, all other embodiments obtained by those skilled in the art without paying creative work shall fall within the protection scope of the present application.

The terms "first", "second", etc. in the specification, claims, and the above-mentioned accompanying drawings of the embodiments of the present application are used to distinguish similar objects, and are not necessarily used to describe a specific order or sequence. It should be understood that the data used in this way can be interchanged under appropriate circumstances, so that the embodiments of the present application described herein can be implemented in a sequence other than, for example, those illustrated or described herein. In addition, the terms "including" and "comprising" and any variations thereof are intended to cover non-exclusive inclusions. For example, a process, method, system, product, or device that includes a series of steps or units is not necessarily limited to those clearly listed steps or units, but may include those that are not clearly listed or are related to the process, method, product, or other steps or units inherent to the device.

In a future communication system, various new types of terminals (also called terminal devices) will appear, such as smart cars, robots, industrial automation devices, etc. These terminals may be centralized in one place and can be covered by a single control signaling beam. These terminals also have the following characteristics: these terminals transmit the same type of data packets in roughly the same time period, and the content of the data packets transmitted by different terminals varies from user to user, but the sizes of the data packets transmitted by these terminals are not much different, and may be transmitted by using the same modulation coding format and Multiple-Input Multiple-Output (MIMO) parameter.

Figure 1:
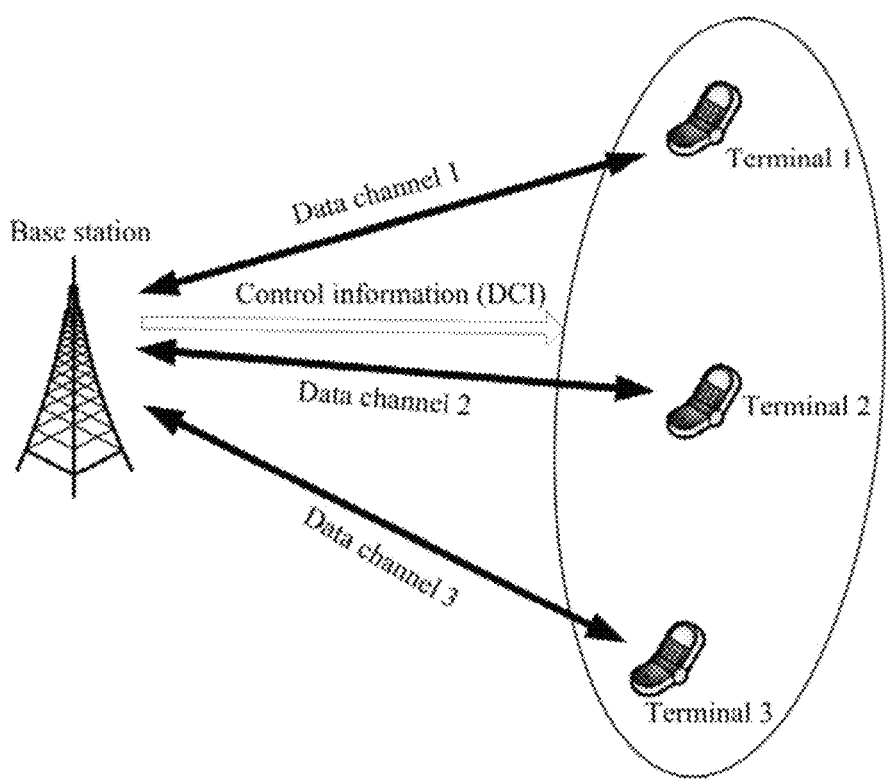
FIG. 1 is a schematic diagram of architecture of a communication system applicable to the present application.

In view of the above-mentioned scenario, an embodiment of the present application provides a terminal scheduling method, which allows the scheduling of multiple terminals in the above-mentioned scenario through a piece of control information (or referred to as control signaling). FIG. 1 is a schematic diagram of architecture of a communication system applicable to the present application. As shown in FIG. 1, the communication system includes a base station and three terminals: a terminal 1, a terminal 2, and a terminal 3, and the base station can schedule the three terminals through a piece of control information.

The control information may be downlink control information (DCI), the base station sends DCI to the terminal device through a physical downlink control channel (PDCCH), and the terminal performs blind detection on the PDCCH and performs demodulation to obtain the DCI.

The three terminals can form a terminal group, and multiple terminals in the terminal group can be scheduled by the base station through a piece of control information. The base station can establish the terminal group when it needs to send a piece of control information, or add the terminal to an existing terminal group during the accessing process of the terminal, or create a new terminal group for the terminal.

When establishing a terminal group for a terminal, the base station configures the terminal with a Cell Radio Network Temporary Identifier (C-RNTI) and a number of the terminal, the number of the terminal indicates an order of the terminal in the terminal group, and the base station can assign numbers to terminals according to the sequence in which the terminals access the network, and can also assign numbers to the terminals according to other rules. The number of the terminal can be used subsequently for the terminal to determine a transmission resource used by the terminal, or can also function in other ways.

In the embodiment of the present application, when the base station sends DCI to the terminals in the terminal group, the DCI is scrambled through the C-RNTI. For different terminal groups, the base station uses different C-RNTIs for scrambling. After a UE in a certain terminal group receives a PDCCH, it uses the C-RNTI corresponding to said terminal group for descrambling. The base station configures the same C-RNTI for the terminals in the same terminal group, to ensure that the terminals in the same terminal group can perform descrambling to obtain the same DCI.

In the embodiment of the present application, each terminal in a terminal group may only know its existence, but may also know the existence of other terminals. For each terminal in the terminal group, the number of terminals in the terminal group and other terminals in the terminal group can be obtained from the base station. The base station can notify each terminal in the group of the number of terminals in the terminal group and the number of the terminal through radio resource control (RRC).

Figure 2:
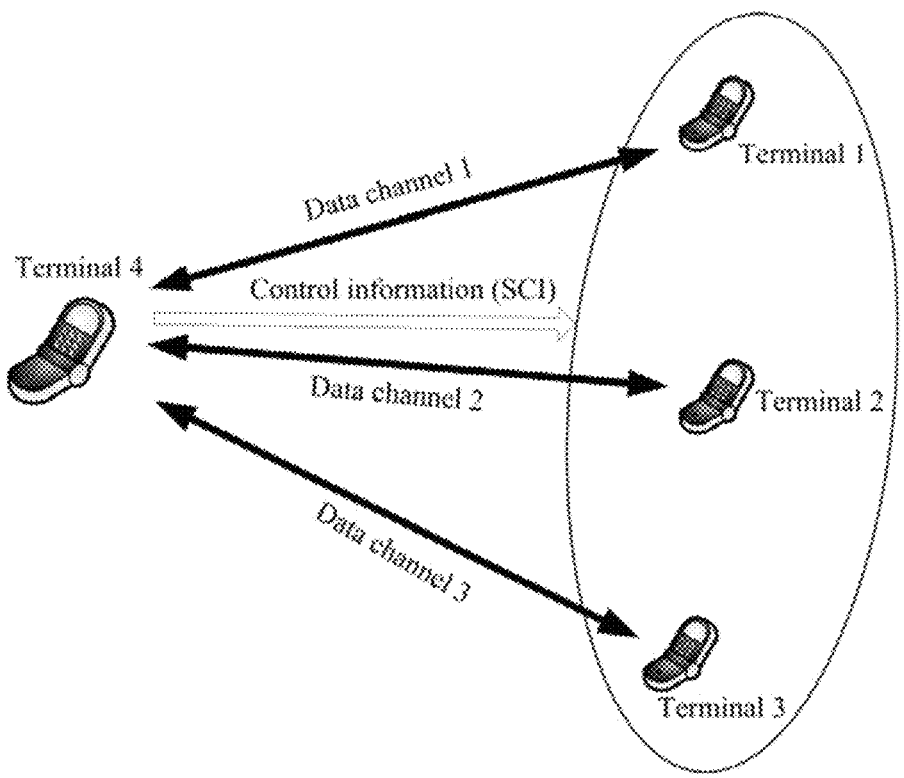
FIG. 2 is a schematic diagram of architecture of another communication system applicable to the present application.

FIG. 2 is a schematic diagram of architecture of another communication system applicable to the present application, as shown in FIG. 2, the communication system includes four terminals: a terminal 1, a terminal 2, a terminal 3, and a terminal 4, where the terminal 1, the terminal 2 and the terminal 3 form a terminal group. The difference from the communication system shown in FIG. 1 is that the terminal 4 schedules the terminals in the terminal group in this architecture, while the base station schedules the terminals in the terminal group in the architecture shown in FIG. 1.

In the architecture shown in FIG. 2, the terminal 4 communicates with the terminals in the terminal group through side links. The side link is also called a secondary link, and communication interfaces between the terminals are PC5 interfaces. Correspondingly, the control information used for scheduling is sidelink control information (SCI). In the architecture shown in FIG. 1, the base station and the terminal communicate through an uplink or a down link, and the interface between the base station and the terminal is a Uu interface.

In the architecture shown in FIG. 1 and FIG. 2, the control information sent by the base station or the terminal used for resource scheduling can schedule different data channels for the terminals in the terminal group for data transmission. For example, the terminal 1 is scheduled to use a data channel 1 to transmit data, the terminal 2 is scheduled to use a data channel 2 to transmit data, and the terminal 3 is scheduled to use a data channel 3 to transmit data. The data channels are used to transmit user data, different data channels use different transmission resources, and the transmission resources include time-domain and/or frequency-domain resources, different data channels can be understood as: different time-domain and/or frequency-domain resources are used bye the data channels.

It can be understood that, in the network architecture shown in FIG. 1 and FIG. 2, the number of terminals in a terminal group is not limited to three, and a terminal group may also include more terminals.

The base station involved in the embodiments of the present application may be a base transceiver station (BTS) of a global system of mobile communication (GSM), a code division multiple access (CDMA) system or a wideband code division multiple access (WCDMA) system, may also be an evolved NodeB (eNB), an access point (AP), or a relay station in a Long Term Evolution (LTE) system, or may also be an NR nodeB (gNB) in a 5th-Generation (5G) system, etc., which are not limited here.

The terminals involved in the embodiments of the present application may be wireless terminals, the wireless terminals may be devices that provide users with voice and/or data connectivity, handheld devices with wireless connection functions, or other processing devices connected to wireless modems. The wireless terminal may communicate with at least one core network via a radio access network (RAN). Wireless terminals can be mobile terminals, such as mobile phones (or called "cellular" phones) and computers with mobile terminals, for example, they can be portable, pocket-sized, handheld, computer-built, or vehicle-mounted mobile devices, which exchange voice and/or data with the wireless access network. The wireless terminal may also be called subscriber unit, subscriber station mobile station, remote station, access point, and remote terminal, access terminal, user terminal, user equipment (UE), or user agent, which are not limited here.

Figure 3:
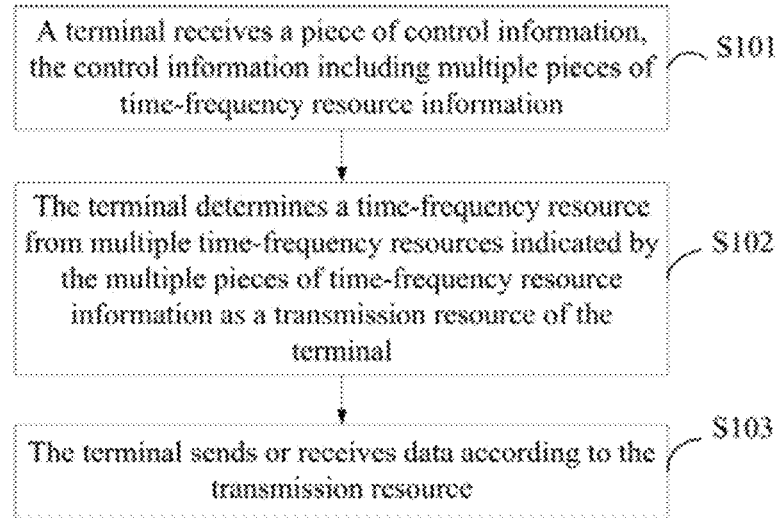
FIG. 3 is a flowchart of a terminal scheduling method provided in Embodiment 1 of the present application.

Based on the network architecture shown above, Embodiment 1 of the present application provides a terminal scheduling method, and FIG. 3 is a flowchart of a terminal scheduling method provided in Embodiment 1 of the present application. As shown in FIG. 3, the method provided by the embodiment includes the following steps:

S101. A terminal receives a piece of control information, the control information including multiple pieces of time-frequency resource information.

The piece of control information may be sent by a scheduling device to the terminal, and the scheduling device may be a base station or a terminal. When the scheduling device is a base station, the control information is DCI. When the scheduling device is a terminal, the control information is SCI. The base station sends the control information to the terminal in a broadcasting manner, and the terminal obtains the control information by monitoring a PDCCH and using a C-RNTI configured by the base station to descramble the PDCCH.

Different from the prior art, the control information is used to indicate time-frequency resources of at least two terminals, where the time-frequency resources of at least two of all the terminals indicated by the control information are different. It can be understood that the control information is used to indicate time-frequency resources of a terminal group, and the terminal group includes at least two terminals.

Where the time-frequency resources of at least two of all the terminals indicated by the control information are different includes the following situations: (1) a time-domain resource and a frequency-domain resource of each terminal in the terminal group are different; (2) time-domain resources and frequency-domain resources of some of the terminals in the terminal group are the same, and frequency-domain resources and time-domain resources of the remaining terminals are different; (3) time-domain resources of all or some of the terminals in the terminal group are the same, and frequency-domain resources of all the terminals in the terminal group are different; (4) frequency-domain resources of all or some of the terminals in the terminal group are the same, and time-domain resources of all the terminals in the terminal group are different.

In the embodiment, the multiple pieces of time-frequency resource information include: multiple, pieces of frequency-domain resource allocation (FDRA) information and multiple pieces of time-domain resource allocation (TDRA) information; multiple pieces of FDRA information and a piece of TDRA information; a piece of FDRA information and multiple pieces of TDRA information.

When the multiple pieces of time-frequency resource information include multiple pieces of FDRA information, each piece of FDRA information corresponds to a frequency-domain resource, and the multiple frequency-domain resources corresponding to the multiple pieces of FDRA information are different, and the sizes of the multiple frequency-domain resources may be the same or different. The frequency-domain resources may be subcarriers or frequency bands. Taking the frequency-domain resource being a subcarrier as an example, the frequency-domain resource corresponding to each piece of FDRA information may occupy a subcarrier or multiple subcarriers. For example, there are 5 pieces of FDRA information in total, and the frequency-domain resource corresponding to each piece of FDRA information occupies a subcarrier, or the frequency-domain resources corresponding to 3 pieces of FORA information occupy a subcarrier, and the frequency-domain resources corresponding to the remaining two pieces of FDRA information occupies 2 subcarriers.

Similarly, when the multiple pieces of time-frequency resource information include multiple pieces of TDRA information, each piece of TDRA information corresponds to a time-domain resource, and multiple time-domain resources corresponding to the multiple pieces of TDRA information are different, and the sizes of the multiple time-domain resources can be the same or different. The time-domain resource may be a subframe, a time slot, a mini subframe, a symbol, or a resource block (RB), etc. Taking the time-domain resource being an RB as an example, the time-domain resource corresponding to each piece of TDRA information may occupy an RB or multiple RBs. For example, there are 5 pieces of TDRA information in total, and the time-domain resource corresponding to each piece of TDRA information occupies 2 RBs respectively, or the time-domain resources corresponding to 3 pieces of TDRA information occupy subcarriers, and the time-domain resources corresponding to the remaining two pieces of TDRA information occupy 3 RBs.

S102. The terminal determines a time-frequency resource from multiple time-frequency resources indicated by the multiple pieces of time-frequency resource information as a transmission resource of the terminal.

The transmission resource of the terminal includes a time-domain resource and a frequency-domain resource. The terminal only uses one time-frequency resource among the multiple time-frequency resources indicated by the multiple pieces of time-frequency resource information, and the remaining time-frequency resources can be used by other terminals in the terminal group.

The time-domain resource and frequency-domain resource used by the terminal may be different from the time-domain resources and frequency-domain resources of other terminals in the terminal group. Or, the time-domain resource used by the terminal is the same as the time-domain resources of other terminals in the terminal group, but the frequency-domain resource used by the terminal is different from the frequency-domain resource(s) of one or more terminals in the terminal group. Or, the time-domain resource used by the terminal is different from the time-domain resource(s) of one or more terminals in the terminal group, but the frequency-domain resource used by the terminal is the same as the frequency-domain resources of other terminals in the terminal group.

In a manner, the terminal receives indication information sent by the scheduling device, where the indication information is used to indicate the terminal to determine a time-frequency resource from the multiple time-frequency resources indicated by the multiple pieces of time-frequency resource information, and the terminal determines the time-frequency resource from the multiple time-frequency resources indicated by the multiple pieces of time-frequency resource information according to the indication information.

In another manner, the terminal determines a time-frequency resource from the multiple time-frequency resources indicated by the multiple pieces of time-frequency resource information according to a serial number of the terminal in a terminal group to which the terminal belongs.

S103. The terminal sends or receives data according to the transmission resource.

The terminal sends uplink data or sidelink data, or receives downlink data or sidelink data, according to the transmission resource.

In the embodiment, a terminal receives a piece of control information sent by a scheduling device, the control information including multiple pieces of time-frequency resource information; the terminal determines a time-frequency resource from multiple time-frequency resources indicated by the multiple pieces of time-frequency resource information as a transmission resource of the terminal and sends or receives data according to the transmission resource. Where the multiple time-frequency resources indicated by the control information can be used by multiple terminals, so that the scheduling device is able to schedule multiple terminals through a piece of control information, thus saving the overheads of sending control signaling and enabling different transmission resources to be scheduled for different terminals through a piece of control information.

Figure 4:
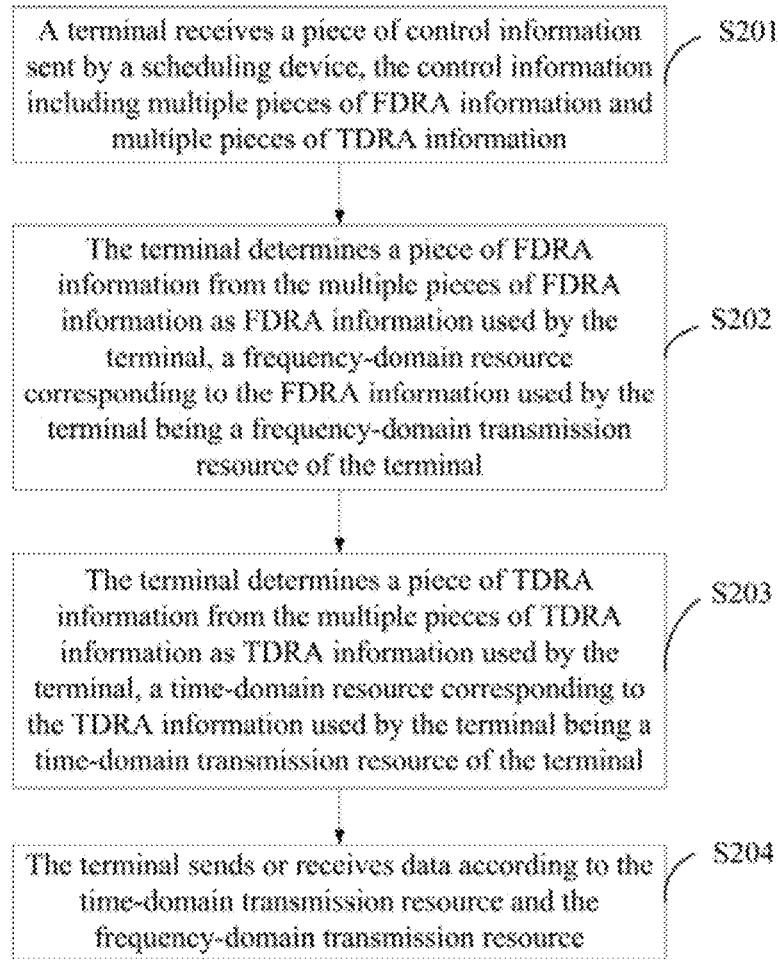
FIG. 4 is a flowchart of a terminal scheduling method provided in Embodiment 2 of the present application.

FIG. 4 is a flowchart of a terminal scheduling method provided in Embodiment 2 of the present application, in the embodiment, an example is taken for description where the control information includes multiple pieces of FDRA information and multiple pieces of TDRA information. As shown in FIG. 4, the method provided by the embodiment includes the following steps:

S201. A terminal receives a piece of control information sent by a scheduling device, the control information including multiple pieces of FDRA information and multiple pieces of TDRA information.

The scheduling device sends the control information to the terminal, where the control information includes multiple pieces of time-frequency resource information, and the multiple pieces of time-frequency resource information includes multiple pieces of FDRA information and multiple pieces of TDRA information, and the multiple pieces of time-frequency resource information are used to schedule a terminal group, the terminal group includes at least two terminals.

Where the number of FDRA information and the number of TDRA information may be the same, or different. When the number of FDRA information and the number of TDRA information are the same, the number of FDRA information and the number of TDRA information may be the same as or different from the number of terminals in the terminal group. When the number of FDRA information and the number of TDRA information are different, either of the number of FDRA information and the number of TDRA information is less than the number of terminals in the terminal group, or both numbers are less than the number of terminals in the terminal group. The embodiment of the present application does not limit the number of FDRA information and the number of TDRA information.

S202. The terminal determines a piece of FDRA information from the multiple pieces of FDRA information as FDRA information used by the terminal, a frequency-domain resource corresponding to the FDRA information used by the terminal being a frequency-domain transmission resource of the terminal.

S203. The terminal determines a piece of TDRA information from the multiple pieces of TDRA information as TDRA information used by the terminal, a time-domain resource corresponding to the TDRA information used by the terminal being a time-domain transmission resource of the terminal.

In the embodiment, the terminal can determine the piece of FDRA information and the piece of TDRA information for the terminal device in the following two manners.

Manner 1: the terminal acquires first indication information and second indication information, where the first indication information is used to indicate a position of FDRA information used by each terminal in a terminal group to which the terminal belongs in the multiple pieces of time-frequency resource information, or an index of FDRA information used by each terminal, the second indication information is used to indicate a position of TDRA information used by each terminal in the terminal group to which the terminal belongs in the multiple pieces of time-frequency resource information, or an index of TDRA information used by the each terminal. The terminal determines, according to the first indication information, the piece of FDRA information from the multiple pieces of FDRA information as the FDRA information used by the terminal, the frequency-domain resource corresponding to the FDRA information used by the terminal being the frequency-domain transmission resource of the terminal; and determines, according to the second indication information, the piece of TDRA information from the multiple pieces of TDRA information as the TDRA information used by the terminal, the time-domain resource corresponding to the TDRA information used by the terminal being the time-domain transmission resource of the terminal.

Figure 5:
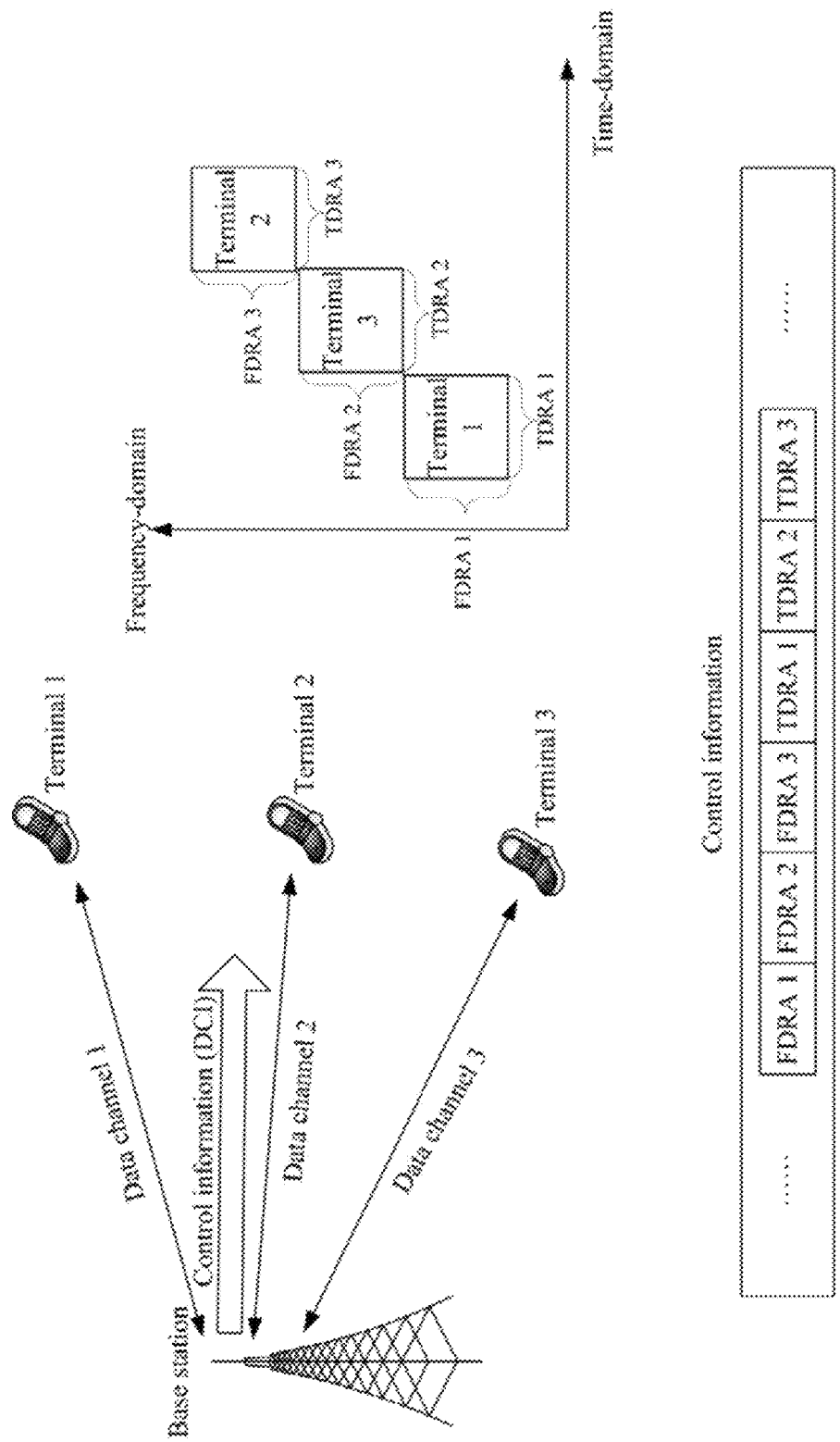
FIG. 5 is a schematic diagram of a base station scheduling terminals.

FIG. 5 is a schematic diagram of a base station scheduling terminals. As shown in FIG. 5, the control information includes 3 pieces of FDRA information: FDRA1, FDRA2, and FDRA3, and 3 pieces of TDRA information: TDRA1, TDRA2, and TDRA3, and there are 3 terminals in the terminal group. In this manner, the number of FDRA information and the number of TDRA information are the same as the number of terminals, therefore, the FDRA information and TDRA information used by the terminals may not repeat.

As shown in FIG. 5, FDRA information and TDRA information are arranged in a way that FDRA information comes first, and TDRA information follows. It can be understood that the embodiment of the present application may not impose any restrictions on the arrangement of the FDRA information and the TDRA information, or the FDRA information and the TDRA information may be arranged in a way, that the TDRA information comes first, and the FDRA information follows, or the FDRA information and the TDRA information are spaced apart.

No matter how the multiple pieces of FDRA information and the multiple pieces of TDRA information are arranged in the multiple pieces of time-frequency resource information, the scheduling device can indicate a location of the FDRA information and a location of TDRA information used by each terminal in the multiple pieces of time-frequency resource information through the first indication and the second indication.

For example, in the example shown in FIG. 5, FDRA information and TDRA information occupy a total of 6 positions, where the first indication information may indicate: FDRA information located in the first position among the 6 positions is FDRA information used by the terminal 1, FDRA information located in the second position among the 6 positions is FDRA information used by the terminal 3, and FDRA information located in the third position among the 6 positions is FDRA information used by the terminal 2. The second indication information may indicate: TDRA information located in the fourth position among the 6 positions is TDRA information used by the terminal 1, TDRA information located in the fifth position among the 6 positions is TDRA information used by terminal 3, and TDRA information located in the sixth position among the 6 positions is TDRA information used by the terminal 2.

The scheduling device may also define an index for each piece of resource allocation information in the multiple pieces of time-frequency resource information. Correspondingly, the first indication information may indicate: the FDRA information corresponding to an index 1 is the FDRA information used by the terminal 1, the FDRA information corresponding to an index 2 is the FDRA information used by the terminal 3, and the FDRA information corresponding to an index 3 is the FDRA information used by the terminal 2. The second indication information may indicate: the TDRA information corresponding to an index 4 is the TDRA information used by the terminal 1, the TDRA information corresponding to an index 5 is the TDRA information used by the terminal 3, and the TDRA information corresponding to an index 6 is the TDRA information used by the terminal 2.

As shown in FIG. 5, the transmission resources of the terminal 1, the terminal 2, and the terminal 3 are different in frequency-domain and time-domain.

Figure 6:
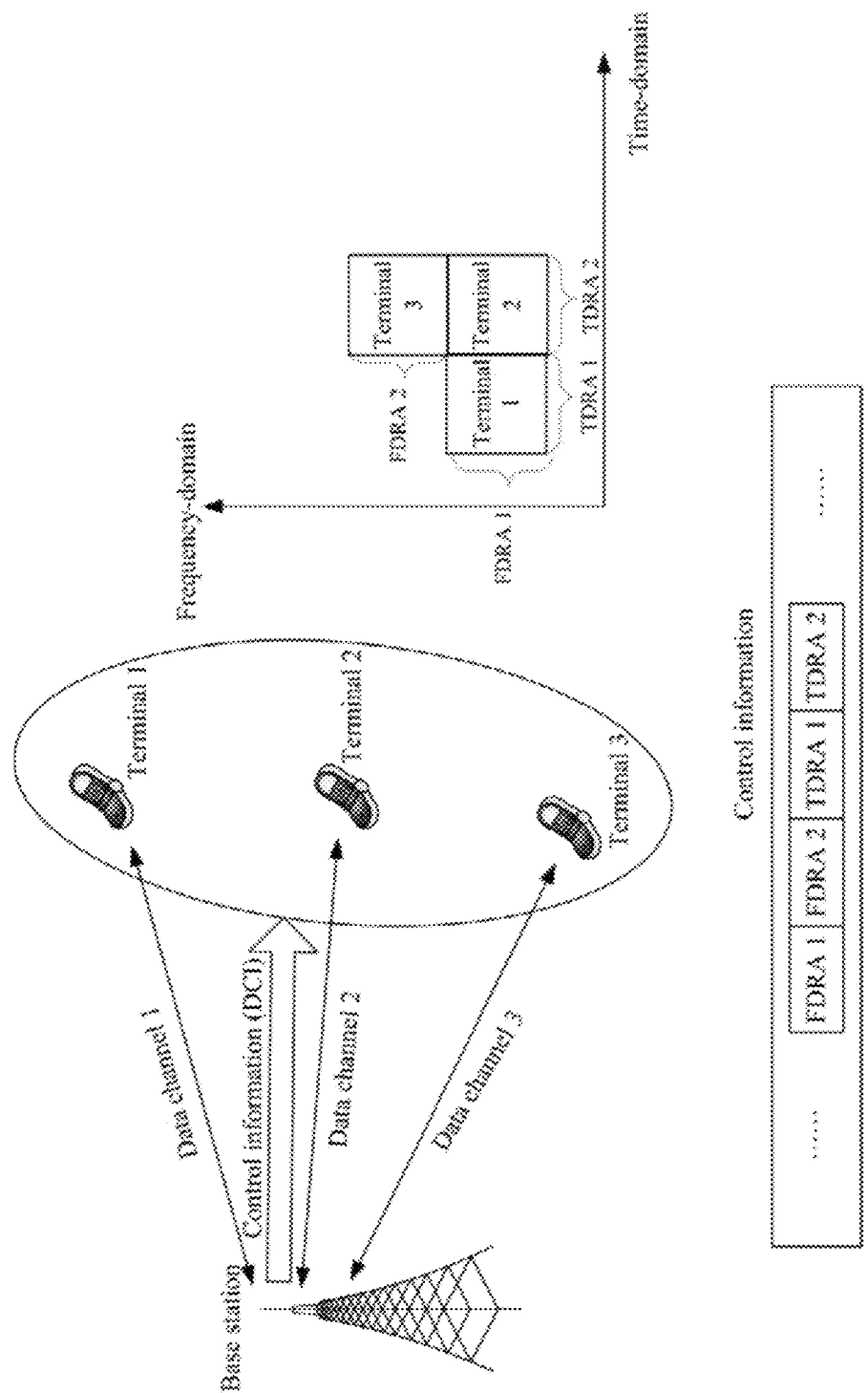
FIG. 6 is another schematic diagram of a base station scheduling terminals.

The method described in Manner 1 is not only applicable to a scenario where the number of FDRA information and the number of TDRA information are the same as the number of terminals, but also applicable to a scenario where the number of FDRA information and the number of TDRA information are less than the number of terminals. FIG. 6 is another schematic diagram of a base station scheduling terminals. As shown in FIG. 6, the control information includes 2 pieces of FDRA information and 2 pieces of TDRA information, and there are 3 terminals in the terminal group in total. The arrangement of the FDRA information and the TDRA information may be the same as the arrangement shown in FIG. 5, but is not limited to the arrangement shown in FIG. 5.

2 pieces of FDRA information and 2 pieces of TDRA information occupy a total of 4 positions. Correspondingly, the first indication information may indicate: FDRA information located in the first position among the 4 positions is FDRA information used by the terminal 1 and the terminal 2, and FDRA information located in the second position among the 4 positions FDRA information used by the terminal 3. The second indication information may indicate: TDRA information located in the third position among the 4 positions is TDRA information used by the terminal 1, and TDRA information located in the fourth position among the 4 positions is TDRA information used by the terminal 2 and the terminal 3. That is, the frequency-domain transmission resource of the terminal 1 and the frequency-domain transmission resource of the terminal 2 are the same, but their time-domain resources are different; the frequency-domain resource of the terminal 2 and the frequency-domain resource of the terminal 3 are different, but their time-domain resources are the same.

Or, the first indication information may indicate: the FDRA information corresponding to an index 1 is the FDRA information used by the terminal 1 and the terminal 2, and the FDRA information corresponding to an index 2 is the FDRA information used by the terminal 3. The second indication information may indicate that the TDRA information corresponding to an index 3 is the TDRA information used by the terminal 1, and the TDRA information corresponding to an index 4 is the TDRA information used by the terminal 2 and the terminal 3.

As shown in FIG. 6, the frequency-domain transmission resource of the terminal 1 and the frequency-domain transmission resource of the terminal 2 are the same, but their time-domain resources are different; the frequency-domain resource of the terminal 2 and the frequency-domain resource of the terminal 3 are different, and their time-domain resources are the same.

The first indication information and the second indication information may be acquired in the following three manners: (1) the first indication information and the second indication information may be sent by the scheduling device through a semi-persistent scheduling (SPS) manner, and when semi-persistent scheduling is adopted, the scheduling device only needs to send the first indication information and the second indication information once through a PDCCH, and then the terminal can periodically reuse the first indication information and the second indication information, the semi-persistent scheduling is configured through upper-layer RRC signaling, and a period of semi-persistent scheduling can be specified while configuration; (2) the first indication information and the second indication information may be sent by the scheduling device to the terminal through dynamic signaling, and the dynamic signaling may be DCI or SCI; (3) the first indication information and the second indication information may be predefined information, for example, a protocol specifies the first indication information.

Generally, the first indication information and the second indication information are indicated through a piece of signaling.

Manner 2: the terminal acquires first indication information and a correspondence between FDRA information and TDRA information, where the first indication information is used to indicate a position of FDRA information used by each terminal in a terminal group to which the terminal belongs in the multiple pieces of FDRA information, or an index of FDRA information used by each terminal. The terminal determines the piece of FDRA information from the multiple pieces of FDRA information as the FDRA information used by the terminal, according to the first indication information; and determines the piece of FDRA information from the multiple pieces of TDRA information as the TDRA information used by the terminal, according to the correspondence and the frequency-domain resource allocation information.

Manner 2 defines the correspondence between FDRA information and TDRA information, that is, FDRA information and TDRA information are bonded. For example, FDRA information corresponding to an index 1 has a correspondence with TDRA information corresponding to an index 5, FDRA information corresponding to an index 2 has correspondence with TDRA information corresponding to an index 4, and FDRA information corresponding to an index 3 has correspondence with TDRA information corresponding to an index 6.

In this manner, the terminal first determines the FDRA information used by the terminal from the multiple pieces of FDRA information according to the first indication information, then determines a first index of TDRA information corresponding to the index of the FDRA information used by the terminal, according to the correspondence and the FDRA information used by the terminal; and determines the piece of TDRA information from the multiple pieces of TDRA information as the TDRA information used by the terminal according to the first index.

It can be understood that the correspondence may not only be the correspondence between indexes of FDRA information and TDRA information, but may also be a correspondence between positions of FDRA information and TDRA information in the multiple pieces of time-frequency resource information. The specific implementation is similar and will not be repeated here.

In this manner, for the manner in which the first indication information is acquired, reference can be made to the three manners described in Manner 1, which will not be repeated here. Similarly, the manner in which the correspondence is acquired can also be as the three manners described in Manner 1. Where the manner in which the first indication information is acquired and the manner in which the correspondence is acquired may be the same or different. For example, the first indication information is indicated through dynamic signaling or a semi persistent scheduling manner, and the correspondence is predefined.

Manner 3: the terminal acquires second indication information and a correspondence between FDRA information and TDRA information, where the second indication information is used to indicate a position of TDRA information used by each terminal in a terminal group to which the terminal belongs in the multiple pieces of TDRA information, or an index of TDRA information used by each terminal. The terminal determines the piece of TDRA information from the multiple pieces of TDRA information as the TDRA information used by the terminal, according to the second indication information; and determines the piece of FDRA information from the multiple pieces of FDRA information as the FDRA information used by the terminal, according to the correspondence and the TDRA information used by the terminal.

The specific manner for the correspondence can refer to the description in Manner 2, which is not repeated here. In this manner, the manner in which the second indication information is acquired can refer to the three manners described in Manner 1, which will not be repeated here. Similarly, the manner in which the correspondence is acquired can also be as the three manners described in Manner 1. Where the manner in which the second indication information is acquired and the manner in which the correspondence is acquired may be the same or different. For example, the second indication information is indicated through dynamic signaling or a semi-persistent scheduling manner, and the correspondence is predefined.

Manner 4: the terminal determines the piece of FDRA information from the multiple pieces of FDRA information as the FDRA information used by the terminal, according to a serial number of the terminal in a terminal group to which the terminal belongs, and determines the piece of TDRA information from the multiple pieces of TDRA information as the TDRA information used by the terminal, according to the serial number of the terminal in the terminal group to which the terminal belongs.

In this manner, the number of FDRA information and/or the number of TDRA information included in the control information may be smaller than the number of terminals in the terminal group, and the number of FDRA information and/or the number of TDRA information included in the control information may also be equal to the number of terminals in the terminal group.

When the number of FDRA information and/or the number of TDRA information included in the control information are also equal to the number of terminals in the terminal croup, the FDRA information and TDRA information used by the terminals are different, that is, the frequency-domain transmission resources and the time-domain transmission resources of the terminals are not repeated.

In this manner, the terminal does not need to acquire the indication information, but can determine the FDRA information and TDRA information used by itself from the control information according to its serial number. For example, the TDRA information with the same serial number as the terminal is determined as the TDRA information used by the terminal, the FDRA information with the same serial number as the terminal is determined as the FDRA information used by the terminal. In this manner, the TDRA information and the FDRA information are required to be numbered separately, and the numbering, manner is the same as the numbering manner for the terminal device. For example, there are 3 terminals in the terminal group, which are numbered 1-3, respectively, then the numbers of TDRA information and the numbers of FDRA information are also three, and are numbered 1-3.

Of course, the TDRA information and the FDRA information included in the control information can also be uniformly numbered, for example, the control information includes 3 pieces of TDRA information and 3 pieces of FDRA information, which can be uniformly numbered 1-6. The serial numbers of the terminals and the serial numbers of the resource allocation information (TDRA information and FDRA information) are calculated in a predefined manner to determine the FDRA information and TDRA information used by the terminal.

When the number of FDRA information and the number of TDRA information included in the control information is less than the number of terminals in the terminal group, the terminal can also calculate the serial amber of the terminal, the number of FDRA information and the number of TDRA information, and the number of terminals in the terminal group in a predefined manner to obtain the FDRA information and the TDRA information used by the terminal.

S204. The terminal sends or receives data according to the time-domain transmission resource and the frequency-domain transmission resource.

The terminal sends uplink data or sidelink data, or receives downlink data or sidelink data according to the time-domain transmission resource and the frequency-domain transmission resource.

In the embodiment, a terminal receives a piece of control information sent by a scheduling device, the control information including multiple pieces of FDRA information and multiple pieces of TDRA information, the terminal determines a piece of FDRA information from the multiple pieces of FDRA information as FDRA information used by the terminal, a frequency-domain resource corresponding to the FDRA information used by the terminal being a frequency-domain transmission resource of the terminal; the terminal determines a piece of TDRA information from the multiple pieces of TDRA information as TDRA information used by the terminal, a time-domain resource corresponding to the TDRA information used by the terminal being a time-domain transmission resource of the terminal; and the terminal sends or receives data according to the time-domain transmission resource and the frequency-domain transmission resource. By carrying multiple pieces of FDRA information and multiple pieces of TDRA information in a piece of control information, each terminal uses only a time-frequency resource among the multiple time-frequency resources indicated by the control information, in this way, the scheduling of multiple terminals can be realized, and the frequency-domain transmission resources and the time-domain transmission resources of the multiple terminals can be different.

Figure 7:
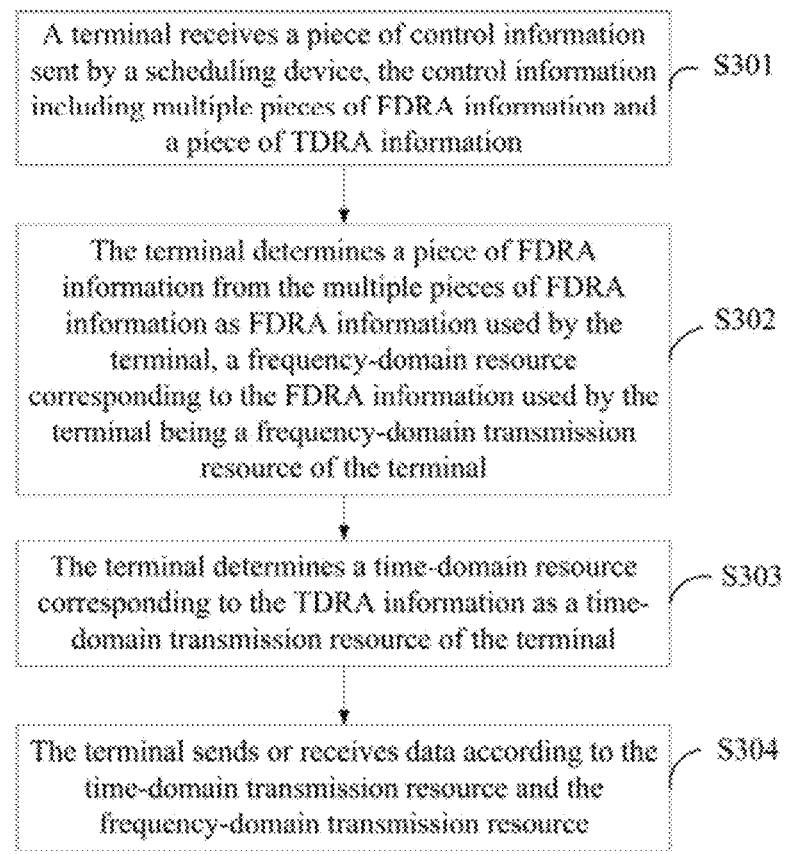
FIG. 7 is a flowchart of a terminal scheduling method provided in Embodiment 3 of the present application.

FIG. 7 is a flowchart of a terminal scheduling method provided in Embodiment 3 of the present application, in the embodiment, an example is taken for description where the control information includes multiple pieces of FDRA information and a piece of TDRA information. As shown in FIG. 7, the method provided in the embodiment includes the following steps:

S301. A terminal receives a piece of control information sent by a scheduling device, the control information including multiple pieces of FDRA information and a piece of TDRA information.

The scheduling device sends control information to the terminal, where the control information includes multiple pieces of time-frequency resource information, the multiple pieces of time-frequency resource information include multiple pieces of FDRA information and a piece of FDRA information, the multiple pieces of time-frequency resource information are used to schedule a terminal group, and the terminal group includes at least two terminals.

Where the number of FDRA information included in the control information and the number of terminals in the terminal group may be the same or different.

S302. The terminal determines a piece of FDRA information from the multiple pieces of FDRA information as FDRA information used by the terminal, a frequency-domain resource corresponding to the FDRA information used by the terminal being a frequency-domain transmission resource of the terminal.

S303. The terminal determines a time-domain resource corresponding to the TDRA information as a time-domain transmission resource of the terminal.

Different from Embodiment 2, the control information includes only one piece of TDRA information, and each terminal in the terminal group uses the time-domain resource corresponding to the TDRA information, that is, the terminals in the terminal group have the same time-domain resource but different frequency-domain resources.

In the embodiment, the terminal can determine the piece of FDRA information as the FDRA information used by the terminal from the multiple pieces of FDRA information in the following two mufflers.

Manner 1: the terminal acquires first indication information, where the first indication information is used to indicate a position of FDRA information used by each terminal in a terminal group to which the terminal belongs in the multiple pieces of FDRA information, or an index of FDRA information used by each terminal, and the terminal determines the piece of FDRA information from the multiple pieces of FDRA information the FDRA information used by the terminal, according to the first indication information.

Where the first indication information may be acquired in the following three manners: (1) the first indication information may be sent by the scheduling device through a semi-persistent scheduling manner; (2) the first indication information may be sent by the scheduling device to the terminal through dynamic signaling, where the dynamic signaling may be DCI or SCI; (3) the first indication information be predefined information, for example, a protocol specifies the first indication information.

Figure 8:
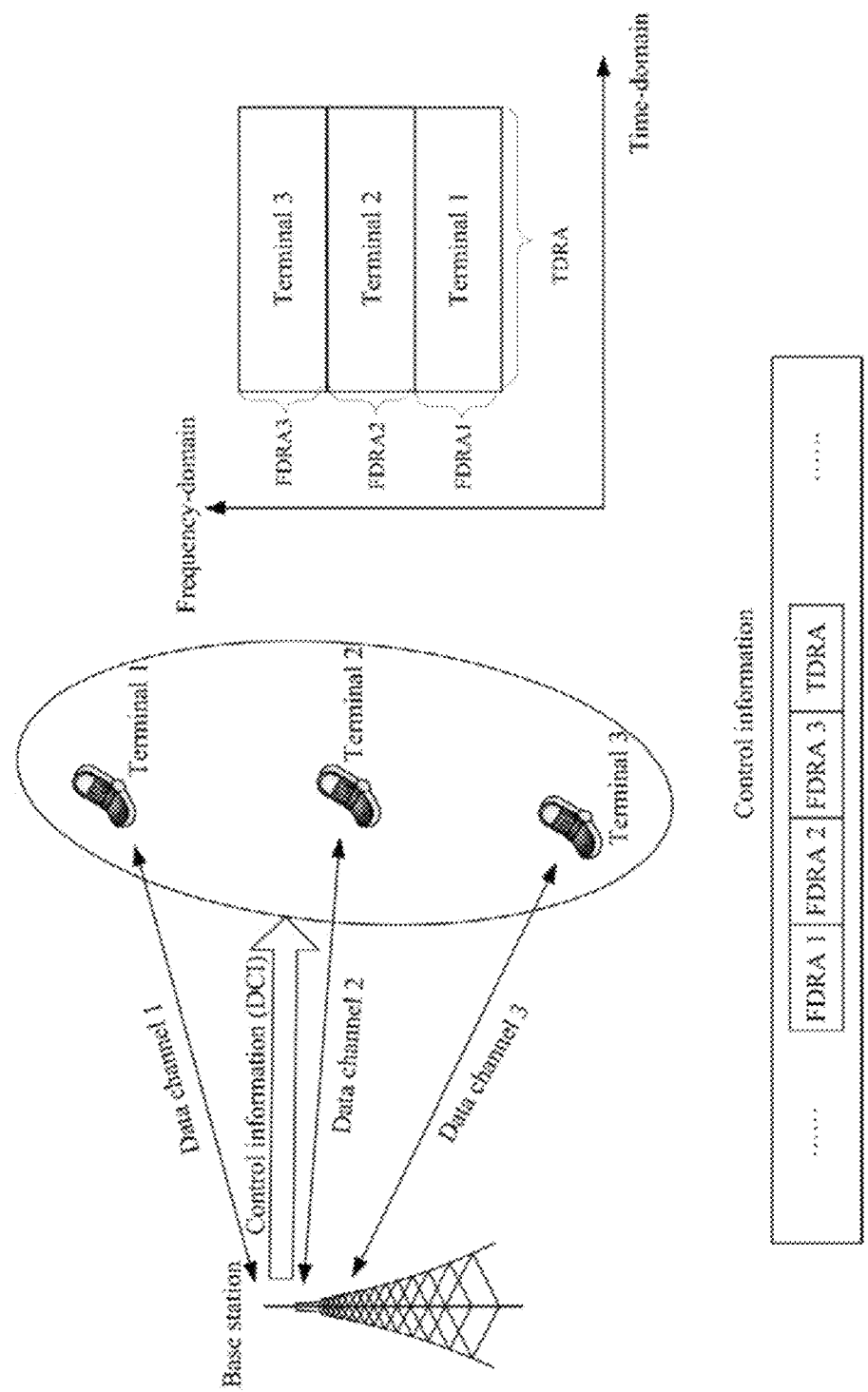
FIG. 8 is another schematic diagram of a base station scheduling terminals.

FIG. 8 is another schematic diagram of a base station scheduling terminals, as shown in FIG. 8, the control information includes 3 pieces of FDRA information and 1 piece of TDRA information, and there are 3 terminals in the terminal group. In this manner, the number of FDRA information and the number of terminals are the same, therefore, the FDRA information used by the terminals may not repeat.

In the example shown in FIG. 8, the FDRA information occupies a total of 3 positions, where the first indication information may indicate: FDRA information located in the first position among the 3 pieces of FDRA information is FDRA information used by the terminal 1, FDRA information located in the second position among the 3 pieces of FDRA information is FDRA information used by the terminal 2, and FDRA information located in the third position among the 3 pieces of FDRA information is FDRA information used by the terminal 3.

The scheduling device may also define an index for each piece of FDRA information. Correspondingly, the first indication information may indicate: the FDRA information corresponding to an index 1 is the FDRA information used by the terminal 1, the FORA information corresponding to an index 2 is the FDRA information used by the terminal 2, and the FDRA information corresponding to an index 3 is the FDRA information used by the terminal 3.

As shown in FIG. 8, the transmission resources of the terminal 1, the terminal 2 and the terminal 3 are all different in the frequency-domain, and are all the same in the time-domain.

Figure 9:
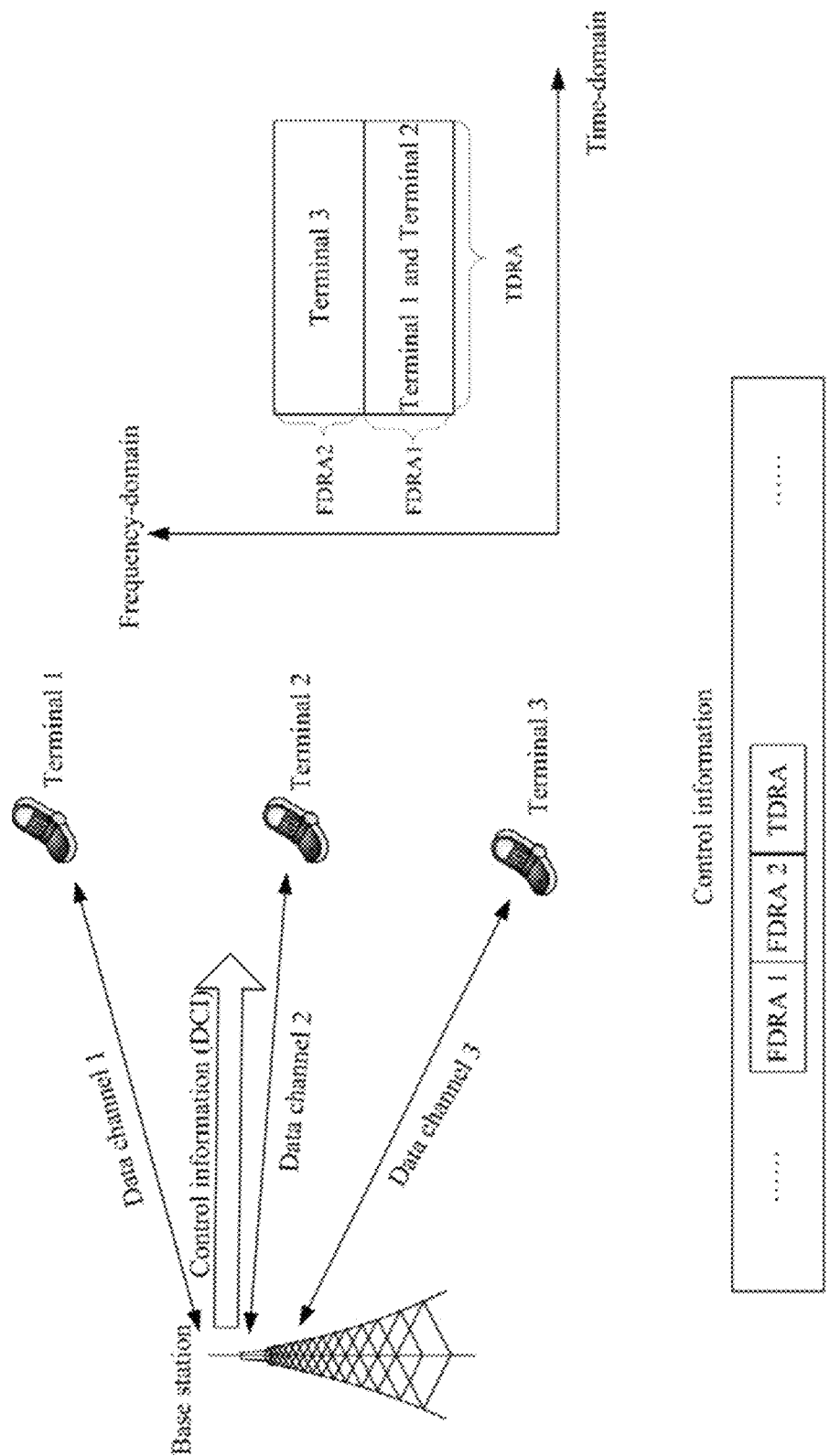
FIG. 9 is another schematic diagram of a base station scheduling terminals.

The method described in Manner 1 is not only applicable to a scenario where the number of FDRA information is the same as the number of terminals in the terminal group, but may also be applicable to a scenario where the number of FDRA information is less than the number of terminals. FIG. 9 is another schematic diagram of a base station scheduling terminals, as shown in FIG. 9, the control information includes 2 pieces of FDRA information, and there are a total of 3 terminals in the terminal group.

Correspondingly, the first indication information may indicate: FDRA information located in the first position of the 2 pieces of FDRA information is FDRA information used by the terminal 1 and the terminal 2, and FDRA information located in the second position of the 2 pieces of FDRA information is FDRA information used by the terminal 3. Alternatively, the first indication information may indicate that the FDRA information corresponding to an index 1 is the FDRA information used by the terminal 1 and the terminal 2, and the FDRA information corresponding to an index 2 is the FDRA information used by the terminal 3.

As shown in FIG. 9, the frequency-domain transmission resource of the terminal 1 and the frequency-domain transmission resource of the terminal 2 are the same, the frequency-domain resource of the terminal 1 and the frequency-domain resource of the terminal 2 are different from the frequency-domain resource of the terminal 3, and the time-domain resource of the terminal 1, the time-domain resource of the terminal 2 and the time-domain resource of the terminal 3 are the same.

Manner 2: the terminal determines the piece of FDRA information from the multiple pieces of FDRA information as the FDRA information used by the terminal, according to a serial number of the terminal in the terminal group.

For example, if the numbering manner for the terminals in the terminal group is the same as the numbering manner for the multiple pieces of FDRA information, the terminal determines that the FDRA information with the same serial number as its own serial number is the FDRA information used by the terminal. Of course, the terminal may also calculate the serial number of the terminal and the FDRA information according to a predefined calculation method to determine the serial number of the FDRA information used by the terminal.

S304. The terminal sends or receives data according to the time-domain transmission resource and the frequency-domain transmission resource.

The terminal sends uplink data or sidelink data, or receives downlink data or sidelink data according to the time-domain transmission resource and the frequency-domain transmission resource.

In the embodiment, a terminal receives a piece of control information sent by a scheduling device, the control information including multiple pieces of FDRA information and a piece of TDRA information; the terminal determines a piece of FDRA information from the multiple pieces of FDRA information a FDRA information used by the terminal, a frequency-domain resource corresponding to the FDRA information used by the terminal being a frequency-domain transmission resource of the terminal; the terminal determines a time-domain resource corresponding to the TDRA information as a time-domain transmission resource of the terminal; and the terminal performs data transmission according to the time-domain transmission resource and the frequency-domain transmission resource. By carrying multiple pieces of FDRA information and a piece of TDRA information in the control information, the scheduling of multiple terminals in the terminal group can be realized, the frequency-domain transmission resources of the multiple terminals can be different while the time-domain transmission resources can be the same.

Figure 10:
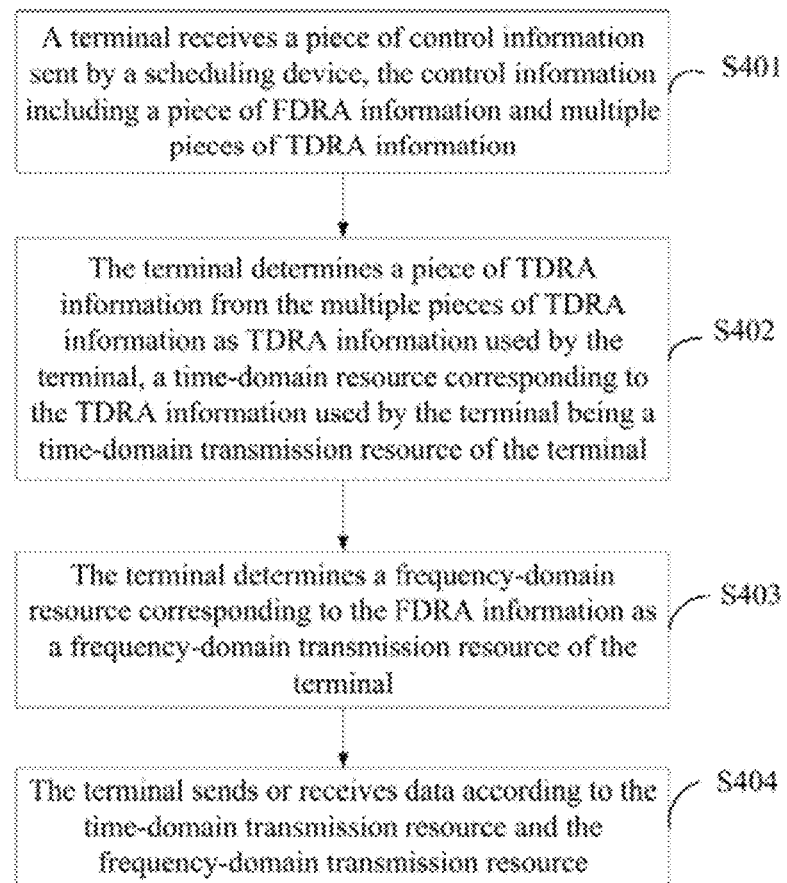
FIG. 10 is a flowchart of a terminal scheduling method provided in Embodiment 4 of the present application.

FIG. 10 is a flowchart of a terminal scheduling method provided in Embodiment 4 of the present application, in the embodiment, an example is taken for description where the control information includes a piece of FDRA information and multiple pieces of TDRA information. As shown in FIG. 10, the method provided in the embodiment includes the following steps:

S401. A terminal receives a piece of control information sent by a scheduling device, the control information including a piece of FORA information and multiple pieces of TDRA information.

The scheduling device sends a piece of control information to the terminal, where the piece of control information includes multiple pieces of time-frequency resource information, the multiple pieces of time-frequency resource information include a piece of FDRA information and multiple pieces of TDRA information, the multiple pieces of time-frequency resource information are used to schedule a terminal group, and the terminal group includes at least two terminals.

Where the number of TDRA information included in the control information and the number of terminals in the terminal group may be the same or different.

S402. The terminal determines a piece of TDRA information from the multiple pieces of TDRA information as TDRA information used by the terminal, a time-domain resource corresponding to the TDRA information used by the terminal being a time-domain transmission resource of the terminal.

S403. The terminal determines a frequency-domain resource corresponding to the FDRA information as a frequency-domain transmission resource of the terminal.

Different from Embodiment 2, the multiple pieces of time-frequency resource information include only a piece of FDRA information, and each terminal in the terminal group uses the frequency-domain resource corresponding to the FDRA information, that is, the terminals in the terminal group have the same frequency-domain resource but different time-domain resources.

In the embodiment, the terminal can determine the piece of TDRA information as the TDRA information used by the terminal in the following two manners.

Manner 1: the terminal acquires second indication information, where the second indication information is used to indicate a position of TDRA used by each terminal in a terminal group to which the terminal belongs in the multiple pieces of TDRA, or an index of TDRA information used by each terminal, and the terminal determines the piece of TDRA information from the multiple pieces of TDRA information as the TDRA information used by the terminal, according to the second indication information.

Where the second indication information may be acquired in the following three manners: (1) the second indication information may be sent by the scheduling device through a semi-persistent scheduling manner; (2) the second indication information may be sent by the scheduling device to the terminal through dynamic signaling, where the dynamic signaling may be DCI or SCI; (3) the second indication information be predefined information, for example, a protocol specifies the second indication information.

Figure 11:
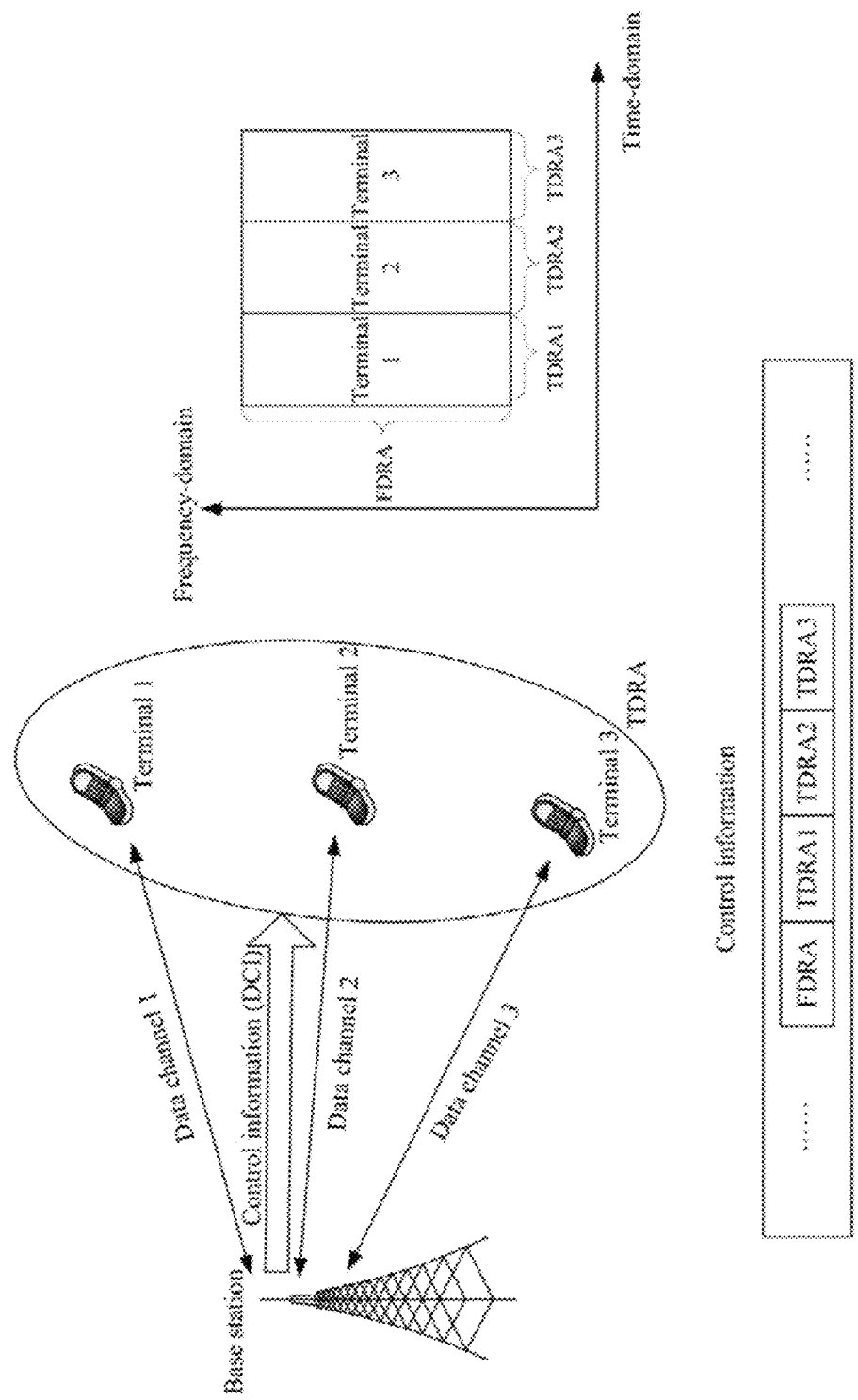
FIG. 11 is another schematic diagram of a base station scheduling terminals.

FIG. 11 is another schematic diagram of a base station scheduling terminals, as shown in FIG. 11, the control information includes 3 pieces of TDRA information and 1 piece of FDRA information, and there are 3 terminals in the terminal group. In this manner, the number of TDRA information and the number of terminals are the same, therefore, the TDRA information used by the terminals may not repeat.

In the example shown in FIG. 11, the TDRA information occupies a total of 3 positions, where the second indication information may indicate: TDRA information located in the first position among the 3 pieces of TDRA information is TDRA information used by the terminal 1, TDRA information located in the second position among the 3 pieces of TDRA information is TDRA information used by the terminal 2, and TDRA information located in the third position among the 3 pieces of TDRA information is TDRA information used by the terminal 3.

The scheduling deice may also define an index for each piece of TDRA information. Correspondingly, the second indication information may indicate: the TDRA information corresponding to an index 1 is the TDRA information used by the terminal 1, the TDRA information corresponding to an index 2 is the TDRA information used by the terminal 2 and the TDRA information corresponding to an index 3 is the TDRA information used by the terminal 3.

As shown in FIG. 11, the transmission resources of the terminal 1, the terminal 2 and the terminal 3 are all different in the time-domain, and are all the same in the frequency-domain.

Figure 12:
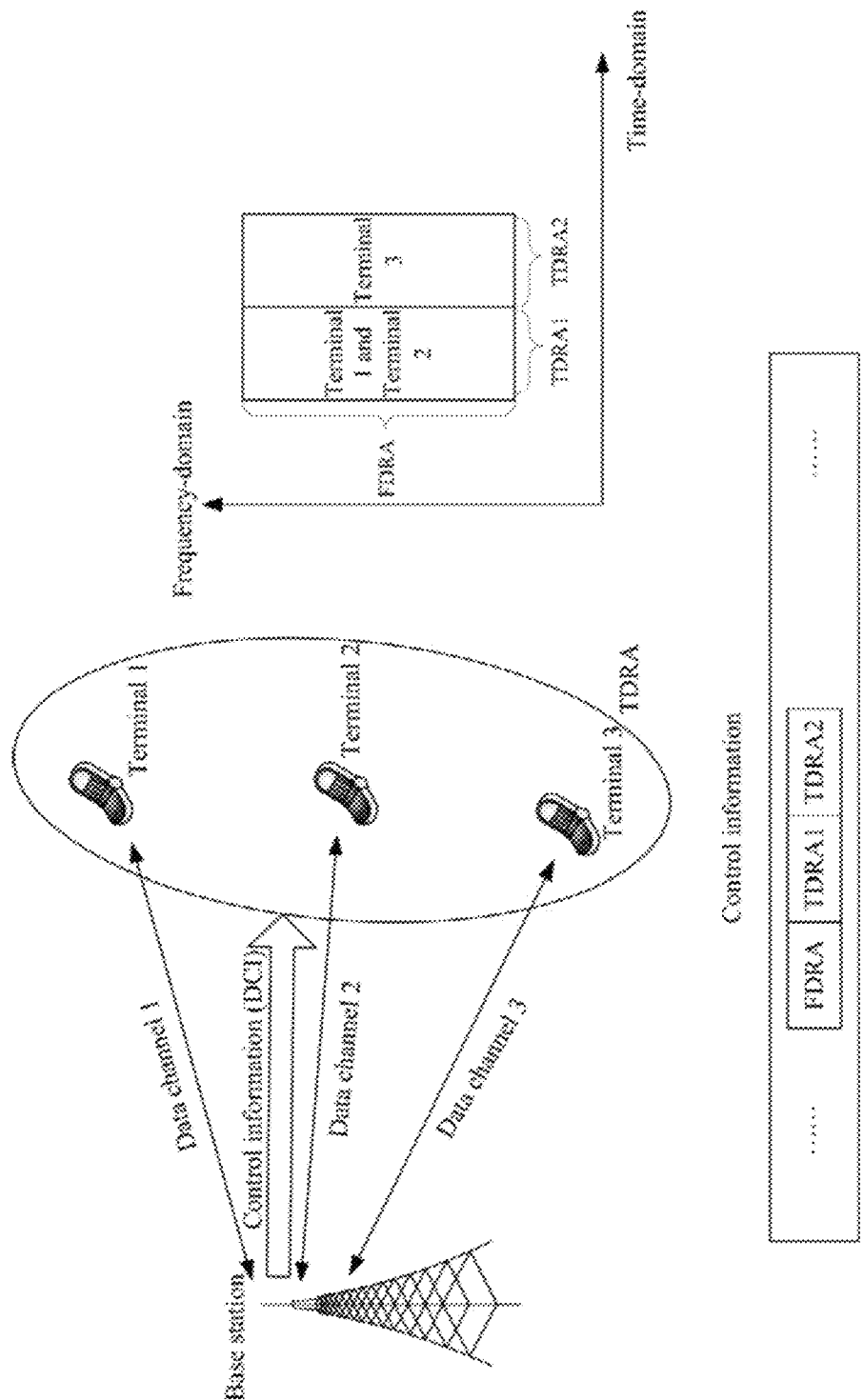
FIG. 12 is another schematic diagram of a base station scheduling terminals.

The method described in Manner 1 is not only applicable to a scenario where the number of TDRA information is the same as the number of terminals in the terminal group, but also applicable to a scenario where the number of TDRA information is less than the number of terminals. FIG. 12 is another schematic diagram of a base station scheduling terminals, as shown in FIG. 12, the control information includes 2 pieces of TDRA information, and there are a total of 3 terminals in the terminal group.

Correspondingly, the second indication information may indicate: TDRA information located in the first position of the 2 pieces of TDRA information is TDRA information used by the terminal 1 and terminal 2, and TDRA information located in the second position of the 2 pieces of TDRA information is TDRA information used by the terminal 3. Or, the second indication information may indicate: the TDRA information corresponding, to an index 1 is the TDRA information used by the terminal 1 and the terminal 2, and the TDRA information corresponding to an index 2 is the TDRA information used by the terminal 3.

As shown in FIG. 12, the frequency-domain transmission resource of the terminal 1, the frequency-domain transmission resource of the terminal 2 and the frequency-domain transmission resource of the terminal 3 are the same, the time-domain resource of the terminal 1 and the time-domain resource of the terminal 2 are the same, and the time-domain resource of the terminal 2 and the time-domain resource of the terminal 3 are different.

Manner 2: the terminal determines the piece of TDRA information from the multiple pieces of TDRA information as the TDRA information used by the terminal, according to a serial number of the terminal in the terminal group.

For example, if the numbering manner for the terminals in the terminal group is the same as the numbering manner for the multiple pieces of TDRA information, the terminal determines that the TDRA information with the same serial number as its own serial number is the TDRA information used by the terminal. Of course, the terminal may also calculate the serial number of the terminal and the TDRA information according to a predefined calculation method to determine the serial number of the TDRA information used by the terminal.

S404. The terminal sends or receives data according to the time-domain transmission resource and the frequency-domain transmission resource.

The terminal sends uplink data or sidelink data, or receives downlink data or sidelink data according to the time-domain transmission resource and the frequency-domain transmission resource.

In the embodiment, a terminal receives a piece of control information sent by a scheduling device, the control information including a piece of FDRA information and multiple pieces of TDRA information; the terminal determines a piece of TDRA information from the multiple pieces of TDRA information as TDRA information used by the terminal, a time-domain resource corresponding to the TDRA information used by the terminal being a time-domain transmission resource of the terminal; the terminal determines a frequency-domain resource corresponding to the FDRA information as a frequency-domain transmission resource of the terminal; and the terminal performs data transmission according to the frequency-domain transmission resource and the time-domain transmission resource. By carrying multiple pieces of TDRA information and a piece of FDRA information in the control information, the scheduling of multiple terminals in the terminal group can be realized, the time-domain transmission resources of the multiple terminals can be different while the frequency-domain transmission resources can be the same.

Figure 13:
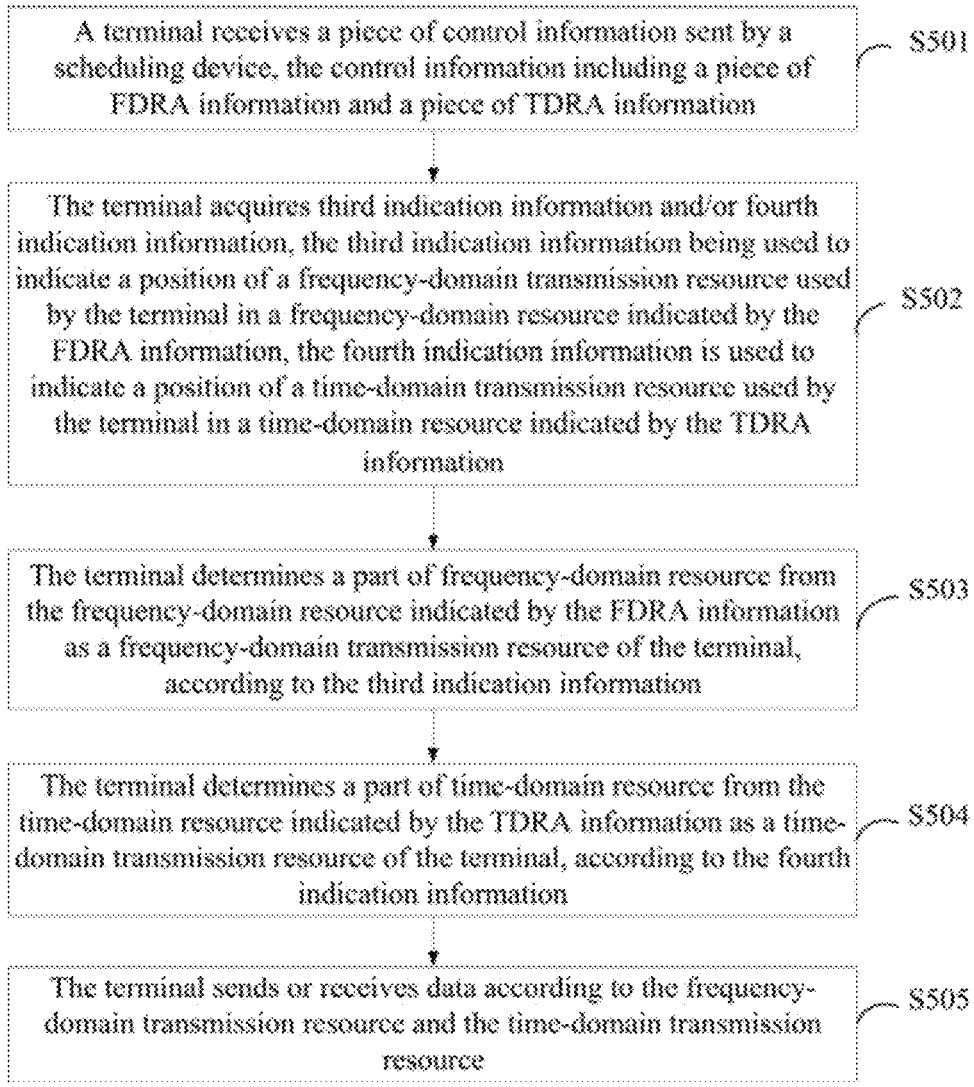
FIG. 13 is a flowchart of a terminal scheduling method provided in Embodiment 5 of the present application.

FIG. 13 is a flowchart of a terminal scheduling method provided in Embodiment 5 of the present application, in the embodiment, an example is taken for description where the control information includes a piece of FDRA information and a piece of TDRA information. As shown in FIG. 13, the method provided in the embodiment includes the following steps:

S501. A terminal receives a piece of control information sent by a scheduling device, the control information including a piece of FDRA information and a piece of TDRA information.

The scheduling device sends a piece of control information to the terminal, where the control information includes a piece of FDRA information and a piece of TDRA information, the control information is used to schedule a terminal group, and the terminal group includes at least two terminals.

S502. The terminal acquires third indication information and/or fourth indication information, the third indication information being used to indicate a position of a frequency-domain transmission resource used by the terminal in a frequency-domain resource indicated by the FDRA information, the fourth indication information being used to indicate a position of a time-domain transmission resource used by the terminal in a time-domain resource indicated by the TDRA information.

The third indication information may include: a starting position and a frequency-domain resource size of a frequency-domain transmission resource used by each terminal in the terminal group to which the terminal belongs; or, a starting position and an ending position of a frequency-domain transmission resource used by each terminal in the terminal group.

The fourth indication information may include: a starting position and a time-domain resource size of a time-domain transmission resource used by each terminal in the terminal group to which the terminal belongs; or, a starting position and an ending position of a time-domain transmission resource used by each terminal in the terminal group.

Where the third indication information and the fourth indication information may both be acquired in the following manners: (1) the third indication information and the fourth indication information may be sent to the terminal by the scheduling device through a semi-persistent scheduling manner; (2) the third indication information and the fourth indication information may be sent by the scheduling device to the terminal through dynamic signaling; (3) the third indication information and the fourth indication information be predefined information.

In an embodiment, the starting position of the time-domain transmission resource used by each terminal is sent by the scheduling device, and the frequency-domain resource size is predefined; or, the starting position of the frequency-domain transmission resource used by each terminal is predefined, and the frequency-domain resource size is sent by the scheduling device.

In an embodiment, the starting position of the time-domain transmission resource used by each terminal is sent by a base station, and the frequency-domain resource size is predefined; or, the starting position of the time-domain transmission resource used by each terminal is predefined, and the frequency-domain resource size is sent by the base station.

S503. The terminal determines a part of frequency-domain resource from the frequency-domain resource indicated by the FDRA information as a frequency-domain transmission resource of the terminal, according to the third indication information.

S504. The terminal determines a part of time-domain resource from the time-domain resource indicated by the TDRA information as a time-domain transmission resource of the terminal, according to the fourth indication information.

If the terminal only acquires the third indication information, then the terminal determines a part of frequency-domain resource from a frequency-domain resource indicated by the FDRA information as a frequency-domain transmission resource of the terminal, according to the third indication information. That is, the frequency-domain transmission resources used by the terminals in the terminal group are different, while the time-domain transmission resources used by the terminals are the same.

Figure 14:
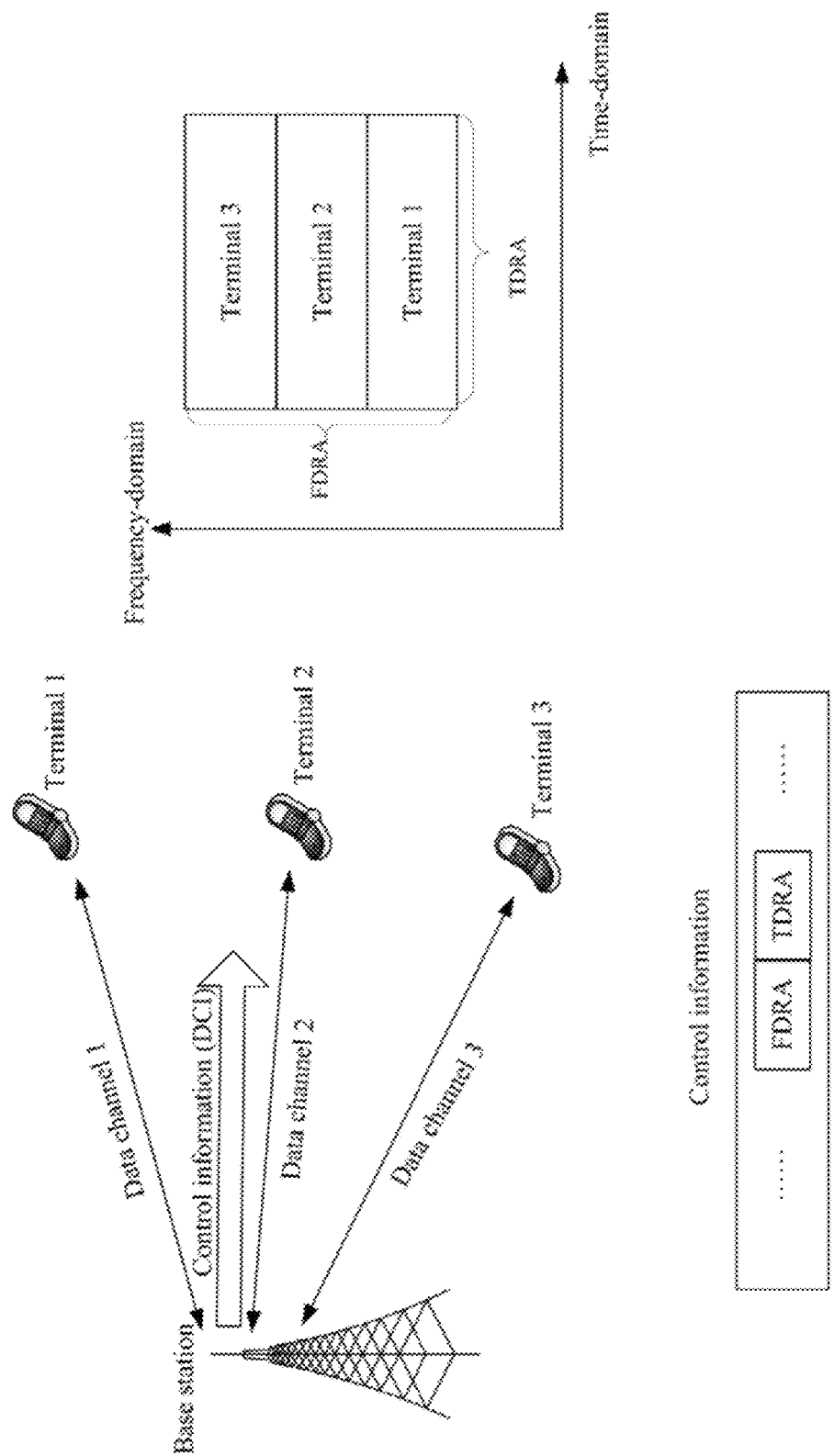
FIG. 14 is another schematic diagram of a base station scheduling terminals.

FIG. 14 is another schematic diagram of a base station scheduling terminals, as shown in FIG. 14, the base station only indicates a piece of TDRA information and a piece of FDRA information, and the terminal group includes three terminals. Each terminal uses a part of resource from a frequency-domain resource indicated by FDRA information as its own frequency-domain transmission resource, and each terminal uses a time-domain resource indicated by the TDRA information as its own time-domain transmission resource.

If the terminal only acquires the fourth indication information, then the terminal determines a part of time-domain resource from a time-domain resource indicated by the TDRA information as a time-domain transmission resource of the terminal, according to the fourth indication information; and the terminal determines a frequency-domain resource indicated by the FDRA information as a frequency-domain transmission resource of the terminal. That is, the time-domain transmission resources used by the terminal in the terminals group are different, while the frequency-domain transmission resources used by the terminals are the same.

Figure 15:
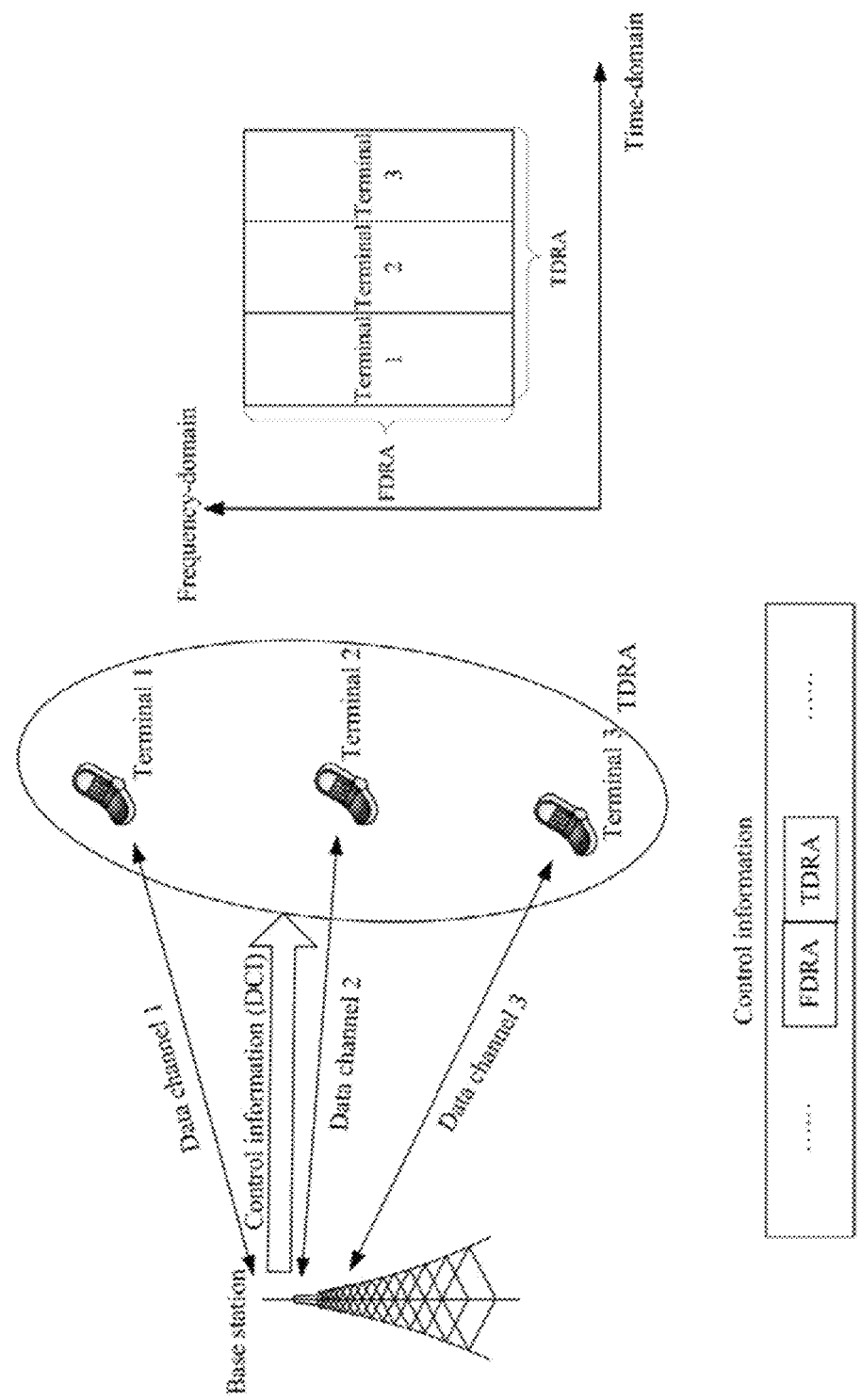
FIG. 15 is another schematic diagram of a base station scheduling terminals.

FIG. 15 is another schematic diagram of a base station scheduling terminals, as shown in FIG. 15, the base station only indicates a piece of TDRA information and a piece of FDRA information, and the terminal group includes three terminals. Each terminal uses a part of resource from a time-domain resource indicated by the TDRA information as its own time-domain transmission resource, and each terminal uses a frequency-domain resource indicated by the FDRA information as its own frequency-domain transmission resource.

If the terminal acquires the third indication information and the fourth indication information, then the terminal determines a part of frequency-domain resource from a frequency-domain resource indicated by the FDRA information as a frequency-domain transmission resource of the terminal, according to the third indication information; and the terminal a part of time-domain resource from a time-domain resource indicated by the TDRA information as a time-domain transmission resource of the terminal, according to the fourth indication information. That is, the time-domain transmission resources used by the terminals in the terminal group are different, and the frequency-domain transmission resources used by the terminals are different.

Figure 16:
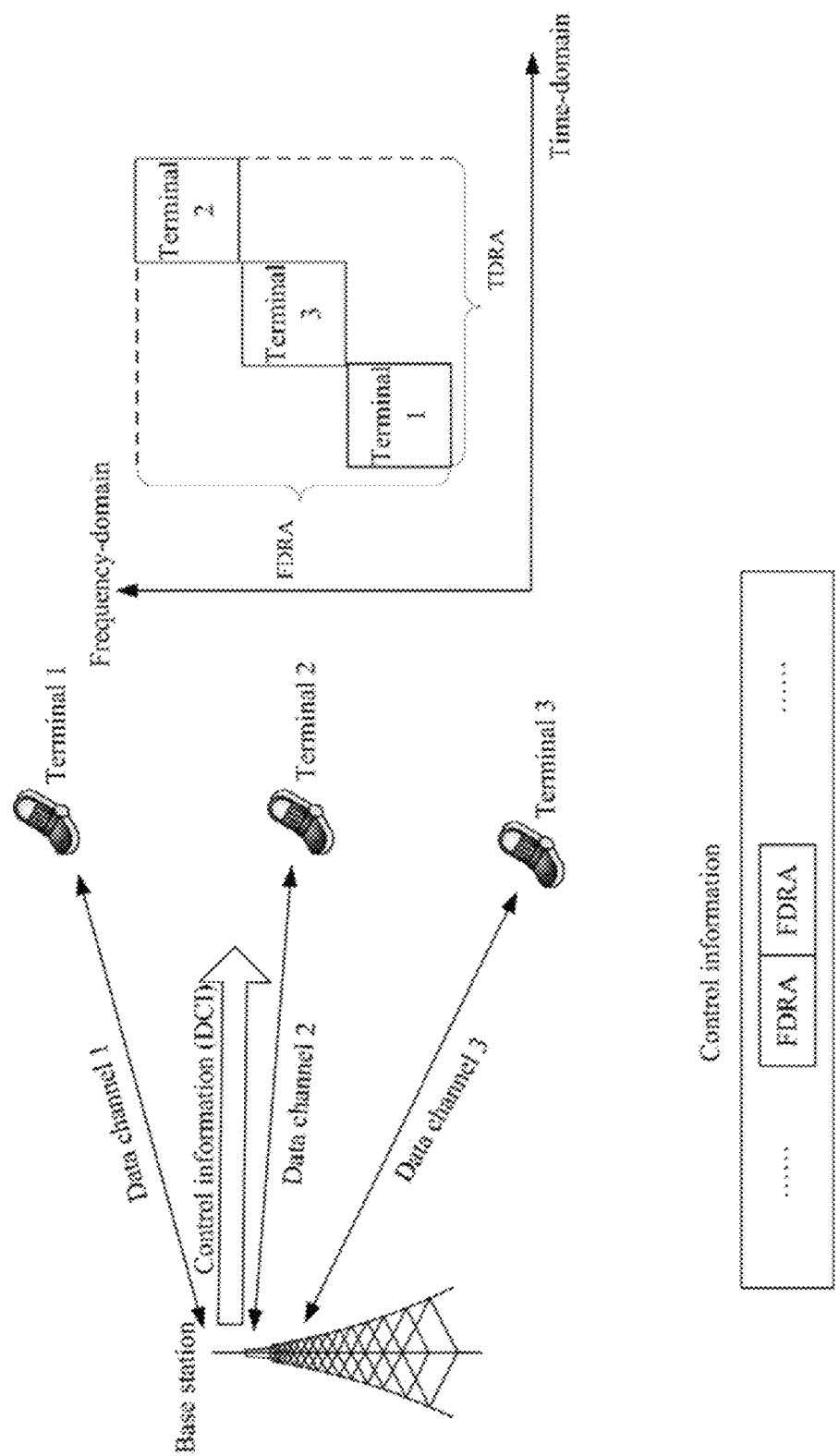
FIG. 16 is another schematic diagram of a base station scheduling terminals.

FIG. 16 is another schematic diagram of a base station scheduling terminals, as shown in FIG. 16, the scheduling device only indicates a piece of TDRA information and a piece of FDRA information, and the terminal group includes three terminals. Each terminal uses a part of resource from a time-domain resource indicated by the TDRA information as its own time-domain transmission resource, and each terminal uses a part of resource from a frequency-domain resource indicated by the FDRA information as its own frequency-domain transmission resource.

S505. The terminal sends or receives data according to the frequency-domain transmission resource and the time-domain transmission resource.

The terminal sends uplink data or sidelink data, or receives downlink data or sidelink data according to the time-domain transmission resource and the frequency-domain transmission resource.

In the embodiment, a terminal receives a piece of control information sent by a scheduling device, the control information including a piece of FDRA information and a piece of TDRA information, and acquires third indication information and/or fourth indication information; the terminal determines a part of frequency-domain resource from a frequency-domain resource indicated by the FDRA information as a frequency-domain transmission resource of the terminal, according to the third indication information; and the terminal determines a part of time-domain resource from a time-domain resource indicated by the TDRA information as a time-domain transmission resource of the terminal, according to the fourth indication information. By carrying a piece of TDRA information and a piece of FDRA information in the control information, each terminal only uses a part of resource indicated by the TDRA information and the FDRA information, thus the scheduling of multiple terminals in the terminal group can be realized, and the time-domain transmission resources and the frequency-domain transmission resources of the multiple terminals can be different.

Figure 17:
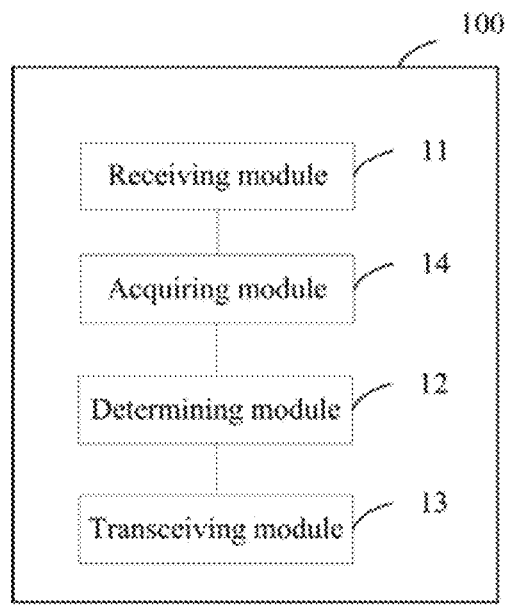
FIG. 17 is a schematic structural diagram of a terminal provided in Embodiment 6 of the present application.

FIG. 17 is a schematic structural diagram of a terminal provided in Embodiment 6 of the present application, as shown in FIG. 17, the terminal 100 includes:

- a receiving module 11, configured to receive a piece of control information, the control information including multiple pieces of time-frequency resource information;
- a determining module 12, configured to determine a time-frequency resource from multiple time-frequency resources indicated by the multiple pieces of time-frequency resource information as a transmission resource of the terminal; and
- a transceiving module 13, configured to send or receive data according to the transmission resource.

In an embodiment, the multiple pieces of time-frequency resource information include multiple pieces of frequency-domain resource allocation information and multiple pieces of time-domain resource allocation information.

In an embodiment, the multiple pieces of time-frequency resource information include multiple pieces of frequency-domain resource allocation information and a piece of time-domain resource allocation information.

In an embodiment, the multiple pieces of time-frequency resource information include a piece of frequency-domain resource allocation information and multiple pieces of time-domain resource allocation information.

When the multiple pieces of time-frequency resource information include multiple pieces of frequency-domain resource allocation information and multiple pieces of time-domain resource allocation information, the determining module 12 is specifically configured to: determine a piece of frequency-domain resource allocation information from the multiple pieces of frequency-domain resource al location information as frequency-domain resource allocation information used by the terminal, a frequency-domain resource corresponding to the frequency-domain resource allocation information used by the terminal being a frequency-domain transmission resource of the terminal; and determine a piece of time-domain resource allocation information from the multiple pieces of time-domain resource allocation information as time-domain resource allocation information used by the terminal, a time-domain resource corresponding to the time-domain resource allocation information used by the terminal being a time-domain transmission resource of the terminal.

The determining module 12 may determine the frequency-domain resource allocation information and time-domain resource allocation information used by the terminal in the following methods.

In an embodiment, the terminal 100 further includes an acquiring module 14.

The acquiring module 14 is configured to acquire first indication information and second indication information, the first indication information being used to indicate a position of frequency-domain resource allocation information used by each terminal in a terminal group to which the terminal belongs in the multiple pieces of time-frequency resource information, or an index of frequency-domain resource allocation information used by each terminal, the second indication information being used to indicate a position of time-domain resource allocation information used by the each terminal in the terminal group to which the terminal belongs in the multiple pieces of time-frequency resource information, or an index of time-domain resource allocation information used by the each terminal.

Correspondingly, the determining module 12 is specifically configured to: determine the piece of frequency-domain resource allocation information from the multiple pieces of frequency-domain resource allocation information as the frequency-domain resource allocation information used by the terminal according to the first indication information; and determine the piece of time-domain resource allocation information from the multiple pieces of time-domain resource allocation information as the time-domain resource allocation information used by the terminal, according to the second indication intimation.

Or, the acquiring module 14 is configured to: acquire first indication information and a correspondence between frequency-domain resource allocation information and time-domain resource allocation information, the first indication information being used to indicate a position of frequency-domain resource allocation information used by each terminal in a terminal group to which the terminal belongs in the multiple pieces of frequency-domain resource allocation information, or an index of frequency-domain resource allocation information used by each terminal.

Correspondingly, the determining module 12 is specifically configured to: determine the piece of frequency-domain resource allocation information from the multiple pieces of frequency-domain resource allocation information as the frequency-domain resource allocation information used by the terminal, according to the first indication information; and determine the piece of time-domain resource allocation information from the multiple pieces of time-domain resource allocation information as the time-domain resource allocation information used by the terminal, according to the correspondence and the frequency-domain resource allocation information used by the terminal.

Or, the acquiring module 14 is configured to: acquire second indication information and a correspondence between frequency-domain resource allocation information and time-domain resource allocation information, the second indication information being used to indicate a position of time-domain resource allocation information used by each terminal in a terminal group to which the terminal belongs in the multiple pieces of time-domain resource allocation information, or an index of time-domain resource allocation information used by each terminal.

Correspondingly, the determining module 12 is specifically configured to: determine the piece of time-domain resource allocation information from the multiple pieces of time-domain resource allocation information as the time-domain resource allocation information used by the terminal, according to the second indication information; and determine the piece of frequency-domain resource allocation information from the multiple pieces of frequency-domain resource allocation information as the frequency-domain resource allocation information used by the terminal, according to the correspondence and the time-domain resource allocation information used by the terminal.

In an embodiment, the determining module 12 is specifically configured to: determine the piece of frequency-domain resource allocation information from the multiple pieces of frequency-domain resource allocation information as the frequency-domain resource allocation information used by the terminal, according to a serial number of the terminal in a terminal group to which the terminal belongs; and determine the piece of time-domain resource allocation information from the multiple pieces of time-domain resource allocation information as the time-domain resource allocation information used by the terminal, according to the serial number of the terminal in the terminal group.

When the multiple pieces of time-frequency resource information includes multiple pieces of frequency-domain resource allocation information and a piece of time-domain resource allocation information, the determining module 12 is specifically configured to: determine a piece of frequency-domain resource allocation information from the multiple pieces of frequency-domain resource allocation information as frequency-domain resource allocation information used by the terminal, a frequency-domain resource corresponding to the frequency-domain resource allocation information used by the terminal being a frequency-domain transmission resource of the terminal; and determine a time-domain resource corresponding to the time-domain resource allocation information as a time-domain transmission resource of the terminal.

In an embodiment, the terminal 100 further includes an acquiring module 14, configured to acquire first indication information, the first indication information being used to indicate a position of frequency-domain resource allocation information used by each terminal in a terminal group to which the terminal belongs in the multiple pieces of frequency-domain resource allocation information, or an index of frequency-domain resource allocation information used by each terminal. Correspondingly, the determining module 12 is specifically configured to: determine the piece of frequency-domain resource allocation information from the multiple pieces of frequency-domain resource allocation information as the frequency-domain resource allocation information used by the terminal, according to the first indication information.

Or, the determining module 14 is specifically configured to: determine the piece of frequency-domain resource allocation information from the multiple pieces of frequency-domain resource allocation information as the frequency-domain resource allocation information used by the terminal, according to a serial number of the terminal in a terminal group to which the terminal belongs.

When the multiple pieces of time-frequency resource information include a piece of frequency-domain resource allocation information and multiple pieces of time-domain resource allocation information, the determining module 12 is specifically configured to: determine a piece of time-domain resource allocation information from the multiple pieces of time-domain resource allocation information as time-domain resource allocation information used by the terminal, a time-domain resource corresponding to the time-domain resource allocation information used by the terminal being a time-domain transmission resource of the terminal; and determine a frequency-domain resource corresponding to the frequency-domain resource allocation information as a frequency-domain transmission resource of the terminal.

In an embodiment, the terminal 100 further includes: an acquiring module 14, configured to acquire second indication information, the second indication information being used to indicate a position of time-domain resource allocation information used by each terminal in a terminal group to which the terminal belongs in the multiple pieces of time-domain resource allocation information, or an index of time-domain resource allocation information used by each terminal. Correspondingly, the determining module 12 is specifically configured to: determine the piece of time-domain resource allocation information from the multiple pieces of time-domain resource allocation information as the time-domain resource allocation information used by the terminal, according to the second indication information.

Or, the determining module 12 is specifically configured to: determine the piece of time-domain resource allocation information from the multiple pieces of time-domain resource allocation information as the time-domain resource allocation information used by the terminal, according to a serial number of the terminal in a terminal group to which the terminal belongs.

In an embodiment, a number of frequency-domain resource allocation information and/or a number of time-domain resource allocation information included in the multiple pieces of time-frequency resource information are equal to a number of terminals in the terminal group. Or, a number of frequency-domain resource allocation information and/or a number of time-domain resource allocation information included in the multiple pieces of time-frequency resource information are smaller than a number of terminals in the terminal group.

In an embodiment, the first indication information is sent by the base station through a semi-persistent scheduling method or dynamic signaling. Or, the first indication information is predefined information.

In an embodiment, the second indication information is sent by the base station through a semi-persistent scheduling method or dynamic signaling. Or, the second indication information is predefined information.

The terminal provided in any implementation method of the embodiment is used to implement the technical solution implemented by the terminal in any one of the above-mentioned Embodiments 1-4, its implementation principles and technical effects are similar, and will not be repeated here.

Figure 18:
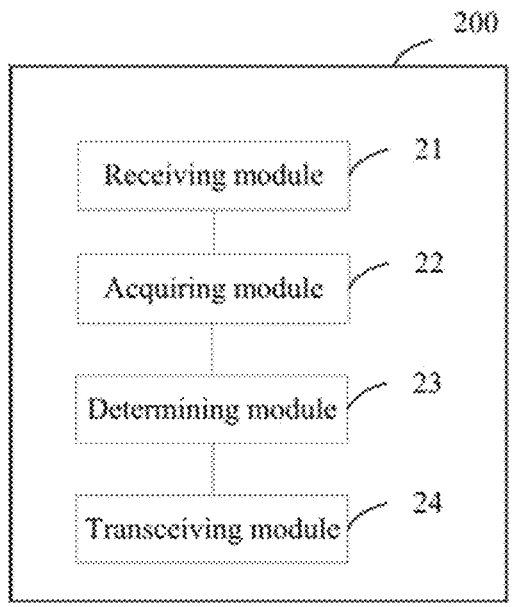
FIG. 18 is a schematic structural diagram of a terminal provided in Embodiment 7 of the present application.

FIG. 18 is a schematic structural diagram of a terminal provided in Embodiment 7 of the present application, as shown in FIG. 18, the terminal 200 includes:

a receiving module 21, configured to receive a piece of control information, the control information including a piece of frequency-domain resource allocation information and a piece of time-domain resource allocation information;

an acquiring module 22, configured to acquire third indication information and/or fourth indication information, the third indication information being used to indicate a position of a frequency-domain transmission resource used by the terminal in a frequency-domain resource indicated by the frequency-domain resource allocation information, the fourth indication information being used to indicate a position of a time-domain transmission resource used by the terminal in a time-domain resource indicated by the time-domain resource allocation information;

a determining module 23, configured to determine a part of frequency-domain resource from the frequency-domain resource indicated by the frequency-domain resource allocation information as a frequency-domain transmission resource of the terminal, and/or, determine a part of time-domain resource from the time-domain resource indicated by the time-domain resource allocation information as a time-domain transmission resource of the terminal, according to the third indication information and/or the fourth indication information; and a transceiving module 24, configured to send or receive data according to the frequency-domain transmission resource and the time-domain transmission resource.

In an embodiment, the third indication information includes: a starting position and/or a frequency-domain resource size of a frequency-domain transmission resource used by each terminal in a terminal group to which the terminal belongs; or, a starting position and an ending position of a frequency-domain transmission resource used by each terminal in a terminal group.

In an embodiment, the third indication information is sent by a scheduling device through a semi persistent scheduling method or dynamic signaling. Or, the third indication information is predefined information.

In an embodiment, the starting position of the frequency-domain transmission resource used by the each terminal is sent by a scheduling device, and the frequency-domain resource size is predefined; or, the starting position of the frequency-domain transmission resource used by the each terminal is predefined, and the frequency-domain resource size is sent by a scheduling device.

In an embodiment, the fourth indication information includes: a starting position and/or a time-domain resource size of a time-domain transmission resource used by each terminal in a terminal group to which the terminal belongs; or, a starting position and an ending position of a time-domain transmission resource used by each terminal in a terminal group.

In an embodiment, the fourth indication information is sent by a scheduling device through a semi-persistent scheduling method or dynamic signaling. Or, the fourth indication information is predefined information.

In an embodiment, the starting position of the time-domain transmission resource used by the each terminal is sent by a scheduling device, and the time-domain resource sire is predefined or, the starting position of the time-domain transmission resource used h the each terminal is predefined, and the time-domain resource size is sent by a scheduling device.

The terminal provided in any implementation method of the embodiment is used to implement the technical solution implemented by the terminal in the above-mentioned Embodiment 5, its implementation principles and technical effects are similar, and will not be repeated here.

Embodiment 8 of the present application provides a scheduling device, the scheduling device includes a sending module, and the sending module is configured to send a piece of control information to a terminal, the control information including multiple pieces of time-frequency resource information. The sending module is further configured to send indication information to the terminal, the indication information being used to indicate the terminal to determine a time-frequency resource from multiple time-frequency resources indicated by the multiple pieces of time-frequency resource information.

In an embodiment, the multiple pieces of time-frequency resource information include multiple pieces of frequency-domain resource allocation information and multiple pieces of time-domain resource allocation information.

In an embodiment, the multiple pieces of time-frequency resource information include multiple pieces of frequency-domain resource allocation information and a piece of time-domain resource allocation information.

In an embodiment, the multiple pieces of time-frequency resource information include a piece of frequency-domain resource allocation information and multiple pieces of time-domain resource allocation information.

In an embodiment, the indication information includes first indication information and second indication information; and the first indication information is used to indicate a position of frequency-domain resource allocation information used by each terminal in a terminal group to which the terminal belongs in the multiple pieces of time-frequency resource information, or an index of frequency-domain resource allocation information used by each terminal; the second indication information is used to indicate a position of time-domain resource allocation information used by the each terminal in the terminal group in the multiple pieces of time-frequency resource information, or an index of time-domain resource allocation information used by the each terminal.

In an embodiment, the indication information includes first indication information and a correspondence between frequency-domain resource allocation information and time-domain resource allocation information; and the first indication information is used to indicate a position of frequency-domain resource allocation information used by each terminal in a terminal group to which the terminal belongs in the multiple pieces of time-frequency resource information, or an index of frequency-domain resource allocation information used by each terminal.

In an embodiment, the indication information includes second indication information and a correspondence between frequency-domain resource allocation information and time-domain resource allocation information, and the second indication information is used to indicate a position of time-domain resource allocation information used by each terminal in a terminal group to which the terminal belongs in the multiple pieces of time-frequency resource information, or an index of time-domain resource allocation information used by each terminal.

In an embodiment, the indication information includes first indication information, and the first indication information is used to indicate a position of frequency-domain resource allocation information used by each terminal in a terminal group to which the terminal belongs in the multiple pieces of frequency-domain resource allocation information, or an index of frequency-domain resource allocation information used by each terminal.

In an embodiment, the indication information includes second indication information, and the second indication information is used to indicate a position of time-domain resource allocation information used by each terminal in a terminal group to which the terminal belongs in the multiple pieces of time-domain resource allocation information, or an index of time-domain resource allocation information used by each terminal.

The scheduling device provided in any implementation method of the embodiment is used to implement the technical solution implemented by the scheduling device in any one of the above-mentioned Embodiments 1-4, its implementation principles and technical effects are similar, and will not be repeated here.

Embodiment 9 of the present application provides a scheduling device, the scheduling device includes a sending module, and the sending module is configured to send a piece of control information to a terminal, the control information including a piece of frequency-domain resource allocation information and a piece of time-domain resource allocation information; and the sending module is further configured to send third indication information and/or fourth indication information to the terminal, the third indication information being used to indicate a position of a frequency-domain transmission resource used by the terminal in a frequency-domain resource indicated by the frequency-domain resource allocation information, the fourth indication information being used to indicate a position of a time-domain transmission resource used by the terminal in a time-domain resource indicated by the time-domain resource allocation information.

In an embodiment, the third indication information includes: a starting position and/or a frequency-domain resource size of a frequency-domain transmission resource used by each terminal in a terminal group to which the terminal belongs; or, a starting position and an ending position of a frequency-domain transmission resource used by each terminal in a terminal group.

In an embodiment, the fourth indication information includes a starting position and/or a time-domain resource size of a time-domain transmission resource used by each terminal in a terminal group to which the terminal belongs; or, a starting position and an ending position of a time-domain transmission resource used by each terminal in a terminal group.

Figure 19:
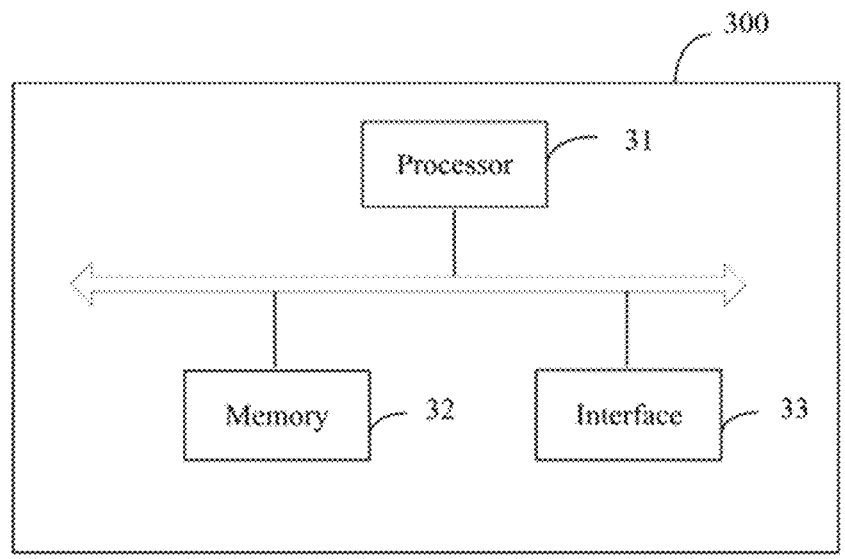
FIG. 19 is a schematic structural diagram of a terminal provided in Embodiment 9 of the present application.

FIG. 19 is a schematic structural diagram of a terminal provided in Embodiment 9 of the present application, as shown in FIG. 19, the terminal 300 includes:
- a processor 31, a memory 32, and an interface 33 for communication with other devices;
- the memory 32 stores a computer-executable instruction; and
- the processor 31 executes the computer-executable instruction stored in the memory, to enable the processor 31 to execute the technical solution executed by the terminal in any one of the above-mentioned method embodiments.

FIG. 19 is a simple design of a UE, the embodiment of the present application does not limit the number of processors and memories in the terminal, and FIG. 19 only takes the number of 1 as an example for illustration.

Figure 20:
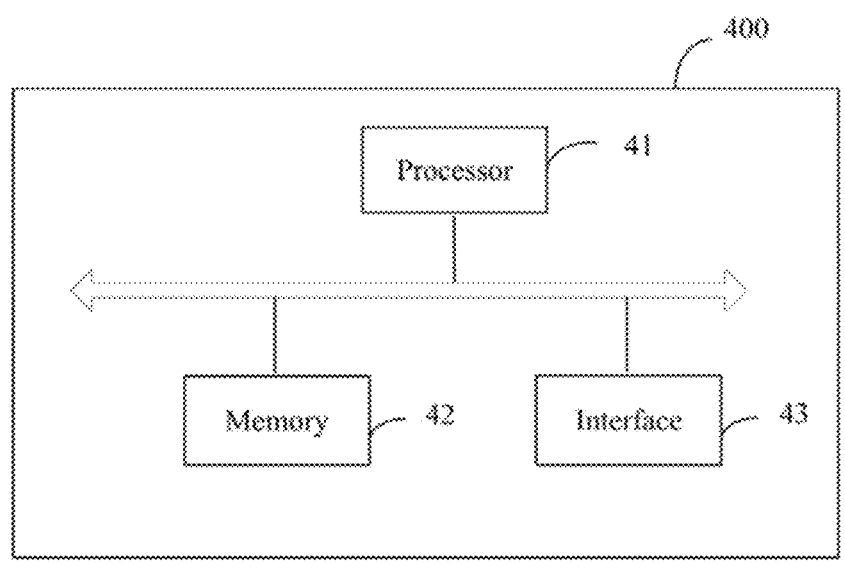
FIG. 20 is a schematic structural diagram of a scheduling device provided in Embodiment 10 of the present application.

FIG. 20 is a schematic structural diagram of a scheduling device provided in Embodiment 10 of the present application, as shown in FIG. 20, the scheduling device 400 includes:
- a processor 41, a memory 42, and an interface 43 for communication with other devices;
- the memory 42 stores a computer-executable instruction; and
- the processor 41 executes the computer-executable instruction stored in the memory, to enable the processor 41 to execute the technical solution executed by the scheduling device in any one of the above-mentioned method embodiments.

FIG. 20 is a simple design of a UE, the embodiment of the present application does not limit the number of processors and memories in the scheduling device, and FIG. 20 only takes the number of 1 as an example for illustration.

In a specific implementation of the terminal or scheduling device shown in the above-mentioned embodiment, the memory, the processor, and the interface may be connected by a bus. In an embodiment, the memory may be integrated inside the processor.

The embodiment of the present application also provides a computer-readable storage medium, the computer-readable storage medium stores a computer-executable instruction, and when the computer-executable instruction is executed by a processor, the technical solution executed by the terminal in any of the above-mentioned method embodiments is implemented.

The embodiment of the present application also provides a computer-readable storage medium, the computer-readable storage medium stores a computer-executable instruction, and when the computer-executable instruction is executed by a processor, the technical solution executed by the scheduling device in any of the above-mentioned method embodiments is implemented.

The embodiment of the present application also provides a program, when the program is executed by the processor, it is used to execute the technical solution executed by the terminal in any of the above-mentioned method embodiments.

The embodiment of the present application also provides a program, when the program is executed by the processor, it is used to execute the technical solution executed by the scheduling, device in any of the above-mentioned method embodiments.

In an embodiment, the above-mentioned processor may be a chip.

The embodiment of the present application also provides a computer program product, including a program instruction, and the program instruction is used to implement the technical solution executed by the terminal in any of the above-mentioned method embodiments.

The embodiment of the present application also provides a computer program product, including a program instruction, and the program instruction is used to implement the technical solution executed by the scheduling device in any of the above-mentioned method embodiments.

The embodiment of the present application also provides a chip, which includes a processing module and a communication interface, and the processing, module can execute the technical solution executed by the terminal in any of the above-mentioned method embodiments.

Further, the chip also includes a storing module (for example, a memory), the storing module is used to store instructions, the processing module is used to execute the instructions stored in the storing module, and the execution of the instructions stored in the storing module causes the processing module to execute the technical solution executed by the terminal in any of the above-mentioned method embodiments.

The embodiment of the present application also provides a chip, which includes a processing module and a communication interface, and the processing, module can execute the technical solution executed by the scheduling device in any of the above-mentioned method embodiments.

Further, the chip also includes a storing module (for example, a memory), the storing module is used to store instructions, the processing module is used to execute the instructions stored in the storing module, and the execution of the instructions stored in the storing module causes the processing module to execute the technical solution executed by the scheduling device in any of the above-mentioned method embodiments.

In the several embodiments provided, in the present application, it should be understood that the disclosed device and method may be implemented in other methods. For example, the device embodiments described above are only illustrative. For example, the division of the modules is only a logical function division, and there may be other divisions in actual implementations, for example, multiple modules can be combined or integrated into another system, or some features can be omitted, or not implemented. On the other hand, the displayed or discussed mutual coupling or direct coupling or communication connection may be indirect coupling or communication connection through some interfaces or modules, and may be in electrical, mechanical or other forms.

In the specific implementation of the above-mentioned scheduling device and terminal, it should be understood that the processor may be a central processing unit (CPU), or other general-purpose processors, digital signal processors (DSP), application specific integrated circuits (ASIC), etc. The general-purpose processor may be a microprocessor or the processor may also be any general processor, etc. The steps of the method disclosed in the present application may be directly embodied as being executed and completed by a hardware processor, or executed and completed by a combination of hardware and software modules in the processor.

All or part of the steps in the above-mentioned method embodiments can be implemented by a program instructing relevant hardware. The above-mentioned program can be stored in a readable memory. When the program is executed, the steps that include the above-mentioned method embodiments are executed; and the above-mentioned memory (storage medium) includes: a read-only memory (ROM), a RAM, a flash memory, a hard disk, a solid state drive, a magnetic tape, a floppy disk, an optical disc and any combination thereof.

What is claimed is:

1. A method for terminal scheduling, comprising:
receiving, by a terminal, a piece of control information, the control information comprising multiple pieces of time-frequency resource information, wherein the multiple pieces of time-frequency resource information are for multiple corresponding terminals in a terminal group, and the multiple corresponding terminals comprise the terminal;
determining, by the terminal, a time-frequency resource from multiple time-frequency resources indicated by the multiple pieces of time-frequency resource information as a transmission resource of the terminal; and
sending or receiving, by the terminal, data according to the transmission resource.

2. The method according to claim 1,
wherein the multiple pieces of time-frequency resource information comprise multiple pieces of frequency-domain resource allocation information and multiple pieces of time-domain resource allocation information; or
wherein the multiple pieces of time-frequency resource information comprise multiple pieces of frequency-domain resource allocation information and a piece of time-domain resource allocation information; or,
wherein the multiple pieces of time-frequency resource information comprise a piece of frequency-domain resource allocation information and multiple pieces of time-domain resource allocation information.

3. The method according to claim 2,
wherein the multiple pieces of time-frequency resource information comprise multiple pieces of frequency-domain resource allocation information and multiple pieces of time-domain resource allocation information;
wherein determining, by the terminal, the time-frequency resource from the multiple time-frequency resources indicated by the multiple pieces of time-frequency resource information as the transmission resource of the terminal comprises:
determining, by the terminal, a piece of frequency-domain resource allocation information from the multiple pieces of frequency-domain resource allocation information as frequency-domain resource allocation information used by the terminal, a frequency-domain resource corresponding to the frequency-domain resource allocation information used by the terminal being a frequency-domain transmission resource of the terminal; and
determining, by the terminal, a piece of time-domain resource allocation information from the multiple pieces of time-domain resource allocation information as time-domain resource allocation information used by the terminal, a time-domain resource corresponding to the time-domain resource allocation information used by the terminal being a time-domain transmission resource of the terminal.

4. The method according to claim 3, further comprising:
acquiring, by the terminal, first indication information and second indication information, the first indication information being used to indicate a position of frequency-domain resource allocation information used by each terminal in the terminal group to which the terminal belongs in the multiple pieces of time-frequency resource information, or an index of frequency-domain resource allocation information used by each terminal, the second indication information being used to indicate a position of time-domain resource allocation information used by the each terminal in the terminal group to which the terminal belongs in the multiple pieces of time-frequency resource information, or an index of time-domain resource allocation information used by the each terminal;
wherein determining, by the terminal, the piece of frequency-domain resource allocation information from the multiple pieces of frequency-domain resource allocation information as the frequency-domain resource allocation information used by the terminal comprises:
determining, by the terminal, the piece of frequency-domain resource allocation information from the multiple pieces of frequency-domain resource allocation information as the frequency-domain resource allocation information used by the terminal, according to the first indication information;
wherein determining, by the terminal, the piece of time-domain resource allocation information from the multiple pieces of time-domain resource allocation information as the time-domain resource allocation information used by the terminal comprises:
determining, by the terminal, the piece of time-domain resource allocation information from the multiple pieces of time-domain resource allocation information as the time-domain resource allocation information used by the terminal, according to the second indication information.

5. The method according to claim 3, further comprising:
acquiring, by the terminal, first indication information and a correspondence between frequency-domain resource allocation information and time-domain resource allocation information, the first indication information being used to indicate a position of frequency-domain resource allocation information used by each terminal in the terminal group to which the terminal belongs in the multiple pieces of frequency-domain resource allocation information, or an index of frequency-domain resource allocation information used by each terminal;

wherein determining, by the terminal, the piece of frequency-domain resource allocation information from the multiple pieces of frequency-domain resource allocation information as the frequency-domain resource allocation information used by the terminal comprises:

determining, by the terminal, the piece of frequency-domain resource allocation information from the multiple pieces of frequency-domain resource allocation information as the frequency-domain resource allocation information used by the terminal, according to the first indication information;

wherein determining, by the terminal, the piece of time-domain resource allocation information from the multiple pieces of time-domain resource allocation information as the time-domain resource allocation information used by the terminal comprises:

determining, by the terminal, the piece of time-domain resource allocation information from the multiple pieces of time-domain resource allocation information as the time-domain resource allocation information used by the terminal, according to the correspondence and the frequency-domain resource allocation information used by the terminal.

6. The method according to claim 3, further comprising:

acquiring, by the terminal, second indication information and a correspondence between frequency-domain resource allocation information and time-domain resource allocation information, the second indication information being used to indicate a position of time-domain resource allocation information used by each terminal in the terminal group to which the terminal belongs in the multiple pieces of time-domain resource allocation information, or an index of time-domain resource allocation information used by each terminal;

wherein determining, by the terminal, the piece of time-domain resource allocation information from the multiple pieces of time-domain resource allocation information as the time-domain resource allocation information used by the terminal comprises:

determining, by the terminal, the piece of time-domain resource allocation information from the multiple pieces of time-domain resource allocation information as the time-domain resource allocation information used by the terminal, according to the second indication information;

wherein determining, by the terminal, the piece of frequency-domain resource allocation information from the multiple pieces of frequency-domain resource allocation information as the frequency-domain resource allocation information used by the terminal comprises:

determining, by the terminal, the piece of frequency-domain resource allocation information from the multiple pieces of frequency-domain resource allocation information as the frequency-domain resource allocation information used by the terminal, according to the correspondence and the time-domain resource allocation information used by the terminal.

7. The method according to claim 3, wherein determining, by the terminal, the piece of frequency-domain resource allocation information from the multiple pieces of frequency-domain resource allocation information as the frequency-domain resource allocation information used by the terminal comprises:

determining, by the terminal, the piece of frequency-domain resource allocation information from the multiple pieces of frequency-domain resource allocation information as the frequency-domain resource allocation information used by the terminal, according to a serial number of the terminal in the terminal group to which the terminal belongs;

wherein determining, by the terminal, the piece of time-domain resource allocation information from the multiple pieces of time-domain resource allocation information as the time-domain resource allocation information used by the terminal comprises:

determining, by the terminal, the piece of time-domain resource allocation information from the multiple pieces of time-domain resource allocation information as the time-domain resource allocation information used by the terminal, according to the serial number of the terminal in the terminal group.

8. The method according to claim 2, wherein the multiple pieces of time-frequency resource information comprise multiple pieces of frequency-domain resource allocation information and a piece of time-domain resource allocation information;

wherein determining, by the terminal, the time-frequency resource from the multiple time-frequency resources indicated by the multiple pieces of time-frequency resource information as the transmission resource of the terminal comprises:

determining, by the terminal, a piece of frequency-domain resource allocation information from the multiple pieces of frequency-domain resource allocation information as frequency-domain resource allocation information used by the terminal, a frequency-domain resource corresponding to the frequency-domain resource allocation information used by the terminal being a frequency-domain transmission resource of the terminal; and determining, by the terminal, a time-domain resource corresponding to the time-domain resource allocation information as a time-domain transmission resource of the terminal.

9. The method according to claim 8, further comprising:

acquiring, by the terminal, first indication information, the first indication information being used to indicate a position of frequency-domain resource allocation information used by each terminal in the terminal group to which the terminal belongs in the multiple pieces of frequency-domain resource allocation information, or an index of frequency-domain resource allocation information used by each terminal; and wherein determining, by the terminal, the piece of frequency-domain resource allocation information from the multiple pieces of frequency-domain resource allocation information as the frequency-domain resource allocation information used by the terminal comprises:

determining, by the terminal, the piece of frequency-domain resource allocation information from the multiple pieces of frequency-domain resource allocation information as the frequency-domain resource allocation information used by the terminal, according to the first indication information.

10. The method according to claim 8, wherein determining, by the terminal, the piece of frequency-domain resource allocation information from the multiple pieces of frequency-domain resource allocation information as the frequency-domain resource allocation information used by the terminal comprises:

determining, by the terminal, the piece of frequency-domain resource allocation information from the multiple pieces of frequency-domain resource allocation information as the frequency-domain resource allocation information used by the terminal, according to a serial number of the terminal in the terminal group to which the terminal belongs.

11. The method according to claim 2,
wherein the multiple pieces of time-frequency resource information comprise a piece of frequency-domain resource allocation information and multiple pieces of time-domain resource allocation information;
wherein determining, by the terminal, the time-frequency resource from the multiple time-frequency resources indicated by the multiple pieces of time-frequency resource information as the transmission resource of the terminal comprises:
determining, by the terminal, a piece of time-domain resource allocation information from the multiple pieces of time-domain resource allocation information as time-domain resource allocation information used by the terminal, a time-domain resource corresponding to the time-domain resource allocation information used by the terminal being a time-domain transmission resource of the terminal; and
determining, by the terminal, a frequency-domain resource corresponding to the frequency-domain resource allocation information as a frequency-domain transmission resource of the terminal.

12. The method according to claim 11, further comprising:
acquiring, by the terminal, second indication information, the second indication information being used to indicate a position of time-domain resource allocation information used by each terminal in the terminal group to which the terminal belongs in the multiple pieces of time-domain resource allocation information, or an index of time-domain resource allocation information used by each terminal; and
wherein determining, by the terminal, the piece of time-domain resource allocation information from the multiple pieces of time-domain resource allocation information as the time-domain resource allocation information used by the terminal comprises:
determining, by the terminal, the piece of time-domain resource allocation information from the multiple pieces of time-domain resource allocation information as the time-domain resource allocation information used by the terminal, according to the second indication information.

13. The method according to claim 11, wherein determining, by the terminal, the piece of time-domain resource allocation information from the multiple pieces of time-domain resource allocation information as the time-domain resource allocation information used by the terminal comprises:
determining, by the terminal, the piece of time-domain resource allocation information from the multiple pieces of time-domain resource allocation information as the time-domain resource allocation information used by the terminal, according to a serial number of the terminal in the terminal group to which the terminal belongs.

14. A terminal scheduling method, comprising:
receiving, by a terminal, a piece of control information, the control information comprising a piece of frequency-domain resource allocation information and a piece of time-domain resource allocation information;
acquiring, by the terminal, at least one of third indication information and fourth indication information to the terminal, the third indication information being used to indicate a position of a frequency-domain transmission resource used by the terminal in a frequency-domain resource indicated by the frequency-domain resource allocation information, the fourth indication information being used to indicate a position of a time-domain transmission resource used by the terminal in a time-domain resource indicated by the time-domain resource allocation information;
performing, by the terminal, at least one of following operations: determining a part of frequency-domain resource from the frequency-domain resource indicated by the frequency-domain resource allocation information as a frequency-domain transmission resource of the terminal, and determining a part of time-domain resource from the time-domain resource indicated by the time-domain allocation information as a time-domain transmission resource of the terminal, according to at least one of the third indication information and the fourth indication information; and
sending or receiving, by the terminal, data according to the frequency-domain transmission resource and the time-domain transmission resource.

15. The method according to claim 14, wherein the third indication information comprises:
at least one of a starting position and a frequency-domain resource size of a frequency-domain transmission resource used by each terminal in a terminal group to which the terminal belongs; or,
a starting position and an ending position of a frequency-domain transmission resource used by each terminal in a terminal group.

16. The method according to claim 14, wherein the fourth indication information comprises:
at least one of a starting position and a time-domain resource size of a time-domain transmission resource used by each terminal in a terminal group to which the terminal belongs; or,
a starting position and an ending position of a time-domain transmission resource used by each terminal in a terminal group.

17. A terminal scheduling method, comprising:
sending, by a scheduling device, a piece of control information to a terminal, the control information comprising multiple pieces of time-frequency resource information; and
sending, by the scheduling device, indication information to the terminal, the indication information being used to indicate the terminal to determine a time-frequency resource from multiple time-frequency resources indicated by the multiple pieces of time-frequency resource information;
wherein the multiple pieces of time-frequency resource information comprise multiple pieces of frequency-domain resource allocation information and multiple pieces of time-domain resource allocation information;
wherein the indication information comprises first indication information and second indication information; and the first indication information is used to indicate a position of frequency-domain resource allocation information used by each terminal in a terminal group to which the terminal belongs in the multiple pieces of time-frequency resource information, or an index of frequency-domain resource allocation information used by each terminal, the second indication information is used to indicate a position of time-domain resource allocation information used by the each terminal in the terminal group to which the terminal belongs in the multiple pieces of time-frequency resource information, or an index of time-domain resource allocation information used by the each terminal; or, wherein the indication information comprises first indication information and a correspondence between frequency-domain resource allocation information and time-domain resource allocation information; and the first indication information is used to indicate a position of frequency-domain resource allocation information used by each terminal in a terminal group to which the terminal belongs in the multiple pieces of time-frequency resource information, or an index of frequency-domain resource allocation information used by each terminal.

\* \* \* \* \*